US012560480B2

(12) United States Patent
Lundquist et al.

(10) Patent No.: US 12,560,480 B2
(45) Date of Patent: Feb. 24, 2026

(54) IMMERSION IMAGING SYSTEMS AND METHODS FOR FLOWCELLS

(71) Applicant: MGI Tech Co., Ltd., Shenzhen (CN)

(72) Inventors: Paul Lundquist, Oakland, CA (US); Razvan Chirita, San Jose, CA (US)

(73) Assignee: MGI Tech Co., Ltd., Shenzhen (CN)

( * ) Notice: Subject to any disclaimer, the term of this patent is extended or adjusted under 35 U.S.C. 154(b) by 218 days.

(21) Appl. No.: 18/483,765

(22) Filed: Oct. 10, 2023

(65) Prior Publication Data

US 2024/0151582 A1 May 9, 2024

Related U.S. Application Data

(60) Provisional application No. 63/382,738, filed on Nov. 8, 2022.

(51) Int. Cl.
| | |
|---|---|
| *G01J 3/02* | (2006.01) |
| *G01J 3/10* | (2006.01) |
| *G01J 3/28* | (2006.01) |

(52) U.S. Cl.
CPC ........... *G01J 3/2803* (2013.01); *G01J 3/0208* (2013.01); *G01J 3/10* (2013.01)

(58) Field of Classification Search
CPC .......... G01J 3/2803; G01J 3/0208; G01J 3/10; G01N 21/77; G01N 2021/757; G01N 2021/7763; G01N 2201/103; G02B 21/33; G02B 21/34
See application file for complete search history.

(56) References Cited

U.S. PATENT DOCUMENTS

| | | | | |
|---|---|---|---|---|
| 5,045,284 | A | * | 9/1991 | Smith .................. G01N 31/164 |
| | | | | 436/124 |
| 5,181,382 | A | | 1/1993 | Middlebrook |
| 6,355,420 | B1 | | 3/2002 | Chan |
| 6,547,721 | B1 | | 4/2003 | Higuma et al. |

(Continued)

FOREIGN PATENT DOCUMENTS

| | | |
|---|---|---|
| CA | 2974241 A1 | 3/2010 |
| CN | 1192745 A | 9/1998 |

(Continued)

OTHER PUBLICATIONS

International Application No. PCT/CN2021/101994, International Preliminary Report on Patentability mailed on Jan. 12, 2023, 6 pages.

(Continued)

*Primary Examiner* — Abdullahi Nur
(74) *Attorney, Agent, or Firm* — Kilpatrick Townsend & Stockton LLP

(57) ABSTRACT

Systems and methods for immersion imaging of a flowcell. In one example, an imaging system includes liquid ports in leading and trailing positions relative to a scanned imaging objective. The leading liquid port dispenses an immersion liquid into a space between the distal end of the imaging objective and the flowcell's cover, with the trailing liquid port collecting the immersion liquid. In another example, an imaging system includes a flowcell with a cover that is moveable relative a substrate. The system is configured to move the imaging objective and flowcell cover as a unit relative to the flowcell substrate.

19 Claims, 20 Drawing Sheets

(56) References Cited

U.S. PATENT DOCUMENTS

| | | | |
|---|---|---|---|
| 6,582,903 | B1 | 6/2003 | Rigler et al. |
| 7,848,016 | B2 | 12/2010 | Dodoc |
| 8,142,351 | B2 | 3/2012 | Aono et al. |
| 8,228,483 | B2 | 7/2012 | Loering et al. |
| 9,494,505 | B2 | 11/2016 | Dennin et al. |
| 9,516,998 | B2 | 12/2016 | Iwasaki |
| 9,547,241 | B2 | 1/2017 | Den Boef et al. |
| 9,624,540 | B2 | 4/2017 | Lundquist et al. |
| 9,884,782 | B2 | 2/2018 | DeRosa et al. |
| 9,967,486 | B2 | 5/2018 | Yoshida |
| 10,244,932 | B2 | 4/2019 | Fujii |
| 10,365,434 | B2 | 7/2019 | Wang et al. |
| 10,512,911 | B1 | 12/2019 | Beckett et al. |
| 10,658,810 | B2 | 5/2020 | Sztein et al. |
| 11,185,857 | B2 | 11/2021 | Eason et al. |
| 11,247,462 | B2 | 2/2022 | Zhou et al. |
| 11,450,544 | B2 | 9/2022 | Kobata et al. |
| 11,467,484 | B2 | 10/2022 | Kim et al. |
| 11,499,962 | B2 | 11/2022 | Barbee et al. |
| 11,650,513 | B2 | 5/2023 | Goorden |
| 12,013,521 | B2 | 6/2024 | Lundquist et al. |
| 12,498,552 | B2 | 12/2025 | Lundquist et al. |
| 2003/0157538 | A1 | 8/2003 | Krull et al. |
| 2005/0227358 | A1 | 10/2005 | McEntee et al. |
| 2007/0141605 | A1* | 6/2007 | Vann .................... G01N 27/447 435/6.12 |
| 2008/0032234 | A1 | 2/2008 | Mizutani |
| 2008/0163278 | A1 | 7/2008 | Wakabayashi et al. |
| 2008/0286158 | A1 | 11/2008 | Watanabe et al. |
| 2010/0027109 | A1 | 2/2010 | Liebel et al. |
| 2011/0081664 | A1 | 4/2011 | Forbes et al. |
| 2013/0016328 | A1 | 1/2013 | Daugharthy et al. |
| 2013/0065795 | A1 | 3/2013 | Allbritton et al. |
| 2013/0316336 | A1 | 11/2013 | Matsui et al. |
| 2015/0064057 | A1 | 3/2015 | Grigoropoulos et al. |
| 2016/0109693 | A1* | 4/2016 | Feng ..................... H04N 23/55 348/79 |
| 2017/0047237 | A1 | 2/2017 | Kobata et al. |
| 2018/0246031 | A1* | 8/2018 | Proskurowski ........ G01N 21/01 |
| 2020/0171501 | A1 | 6/2020 | McEwen et al. |
| 2020/0243364 | A1 | 7/2020 | Kobata et al. |

FOREIGN PATENT DOCUMENTS

| | | | | |
|---|---|---|---|---|
| CN | 1963673 | A | * | 5/2007 |
| CN | 108474022 | A | | 8/2018 |
| JP | 2001514739 | A | | 9/2001 |
| JP | 2004075780 | A | | 3/2004 |
| JP | 2006114891 | A | | 4/2006 |
| JP | 2007005525 | A | | 1/2007 |
| JP | 2008309777 | A | | 12/2008 |
| JP | 2010503030 | A | | 1/2010 |
| JP | 2010026218 | A | | 2/2010 |
| JP | 2012173059 | A | | 9/2012 |
| JP | 6286183 | B2 | | 2/2018 |
| WO | 2007010803 | A1 | | 1/2007 |
| WO | WO-2017191087 | A1 | * | 11/2017 ......... G01N 21/4788 |

OTHER PUBLICATIONS

International Application No. PCT/CN2021/101994, International Search Report and Written Opinion mailed on Sep. 24, 2021, 11 pages.

International Application No. PCT/CN2023/126398, International Preliminary Report on Patentability mailed on May 22, 2025, 6 pages.

* cited by examiner

IMMERSION IMAGING SYSTEMS AND METHODS FOR FLOWCELLS

CROSS-REFERENCE TO RELATED APPLICATIONS

This patent claims priority to and the benefit of the filing date of U.S. provisional patent application Ser. No. 63/382,738 filed Nov. 8, 2022 to "Immersion Imaging Systems and Methods for Flowcells," the entire contents of which are hereby incorporated by this reference.

RELATED FIELDS

Flowcell imaging systems and methods, such as imaging systems and methods for non-air gap imaging of biochemical reactions in flowcells during nucleic acid sequencing or other biochemical analyses generally.

BACKGROUND

Obtaining useful data from optical imaging of biochemical reactions in a flowcell can require high spatial resolution, accuracy, and speed. Images may need to be obtained at high enough magnification for individual sample locations to be clearly resolved (in some instances, at micrometer or nanometer scales). At the same time, the images may need to cover a large enough field of view for samples to be correctly identified. For large-scale studies, the imaging and image processing ideally should take place quickly enough in order to be commercially feasible. The Numerical Aperture (NA) of an optical system used for sequencing has several implications: first, the NA determines the limit of the optical resolution, or the density of DNA samples that can be arranged on a sample. To first order, the density of DNA samples will scale as $NA^2$. Second, the NA determines the maximum fraction of light that can be collected by the optical system. To first order, the collection efficiency of an optical system can scale again as $NA^2$, for example a 10% increase in the NA can enable a 21% increase in the optical signal. In addition, higher numerical aperture and the higher optical resolution allows significant reductions in optical crosstalk and associated noise levels, for a given density.

Step-and-repeat imagers and time-delay integration (TDI) imagers are two broad types of imaging systems that can be used to image biochemical reactions in a flowcell. Step-and-repeat systems can acquire about 10 megapixels of image data per second with about 5 μm alignment accuracy. TDI systems can acquire about 30 megapixels of image data per second with about 50 nm alignment accuracy. While for some applications these two types of systems may perform reasonably well, for other applications existing iterations of these systems suffer from some structural and functional disadvantages that adversely affect overall throughput. For example, applications involving large-scale biochemical experiment studies (e.g., such as massively parallel whole genome sequencing) would benefit from higher overall throughput than what many step-and-repeat and TDI imaging systems can currently deliver.

The numerical Aperture of an optical system is limited by the lowest refractive index of media between the sample and the objective lens. The index of most glasses is between 1.4 and 1.6, and the index of water is roughly 1.33. The index of air is 1.0. Thus the performance of optical systems that include a layer of air or substitute a layer of water rather than air can be considered to have >30% difference in Numerical Aperture, which is quite significant in terms of optical resolution, DNA sample density, and optical collection efficiency. Further, the substitution of the water layer with oil, having a typical index of 1.5, can also represent a substantial improvement.

SUMMARY

This disclosure presents improved systems and methods for imaging flowcells. These systems and methods may be employed in, for example, sequencing of template nucleic acid molecules disposed on a substrate of a flowcell. The substrate may include an array of spots or other binding sites for receiving and retaining biochemical molecules. The systems and methods described herein may be configured to image the substrate by rapidly scanning an objective over the substrate. The systems and methods described herein provide improved performance over many conventional systems, thereby allowing for increased density of biochemical molecules on the substrate and other benefits.

In one example, a flowcell imaging system includes (a) a flowcell, the flowcell including a substrate, a cover, and a fluid passageway between the substrate and the cover; (b) an imaging objective, the imaging objective including a distal end spaced from the flowcell cover; (c) an actuator configured to translate the flowcell relative to the imaging objective; and (d) a first liquid port, in which the system is configured to dispense a liquid from the first liquid port into a space between the distal end of the imaging objective and the flowcell cover while the flowcell translates relative to the imaging objective.

In some implementations, the flowcell imaging system may further include a second liquid port, in which the system is configured to collect the liquid into the second liquid port from the space between the distal end of the imaging objective and the flowcell cover while the flowcell translates relative to the imaging objective.

In some implementations, the flowcell imaging system may be configured to maintain a moving puddle of liquid between the distal end of the imaging objective and the cover of the flowcell as the flowcell translates relative to the imaging objective.

In some implementations, the flowcell imaging system may be configured to maintain a moving puddle of liquid that fills the space between the distal end of the imaging objective and the cover of the flowcell as the flowcell translates relative to the imaging objective.

In some implementations, the imaging objective of the flowcell imaging system may include a first side and a second side opposite the first side, in which the first liquid port is positioned at the first side of the imaging objective and the second liquid port is positioned at the second side of the imaging objective.

In some implementations, the flowcell imaging system may be configured to dispense the liquid from the first liquid port and collect the liquid into the second liquid port while the system images the flowcell.

In some implementations, the actuator of the flowcell imaging system may be a translation stage configured to move the flowcell.

In some implementations, the flowcell imaging system may operate such that, while the actuator translates the flowcell relative to the imaging objective in a first direction, the first liquid port dispenses the liquid into the space between the distal end of the imaging objective and the flowcell and the second liquid port collects the liquid from the space between the distal end of the imaging objective and the flowcell.

In some implementations, the flowcell imaging system may operate such that, while the actuator translates the flowcell relative to the imaging objective in the first direction, the first liquid port is in a leading position relative to the translation of the imaging objective and the second liquid port is in a trailing position relative to the translation of the imaging objective.

In some implementations, the flowcell imaging system may operate such that the system is configured to alternatively dispense and collect the liquid from the first liquid port and is configured to alternatively dispense and collect the liquid from the second liquid port.

In some implementations, the flowcell imaging system may be configured such that the first and second liquid ports are fluidically connected to a pumping sub-system that operates in a first state to dispense the liquid from the first liquid port and collect the liquid into the second liquid port and that operates in a second state to dispense the liquid from the second liquid port and collect the liquid into the first liquid port.

In some implementations, the flowcell imaging system may be configured such that, while the actuator translates the flowcell relative to the imaging objective in a second direction different from the first direction, the second liquid port dispenses the liquid into the space between the distal end of the imaging objective and the flowcell and the first liquid port collects the liquid from the space between the distal end of the imaging objective and the flowcell.

In some implementations, the flowcell imaging system may further include a third liquid port and a fourth liquid port.

In some implementations, the flowcell imaging system may be configured to dispense the liquid from the first liquid port and collect the liquid into the second liquid port while the actuator translates the flowcell relative to the imaging objective in a first direction, and wherein the system is configured to dispense the liquid from the third liquid port and collect the liquid into the fourth liquid port while the actuator translates the flowcell relative to the imaging objective in a second direction different from the first direction.

In some implementations, the flowcell imaging system may be configured such that the second direction is opposite the first direction.

In some implementations, the flowcell imaging system may be configured to dispense the liquid from the first liquid port and collect the liquid into the second liquid port while the actuator translates the flowcell relative to the imaging objective in a first direction; and further configured to dispense the liquid from the second liquid port and collect the liquid into the first liquid port while the actuator translates the flowcell relative to the imaging objective in a second direction different from the first direction; and further configured to dispense the liquid from the third liquid port and collect the liquid into the fourth liquid port while the actuator translates the flowcell relative to the imaging objective in a third direction different from the first and second directions.

In some implementations, the cover of the flowcell may be a second substrate of the flowcell.

In some implementations, the actuator is configured to translate the flowcell relative to both the imaging objective and the first and second liquid ports.

In another example, a flowcell imaging method includes: (a) scanning an imaging objective relative to a flowcell, in which: (i) the flowcell includes a substrate, a cover, and a fluid passageway between the substrate and the cover, and (ii) the imaging objective includes a distal end spaced from the flowcell cover; (b) while the imaging objective is scanned relative to the flowcell, dispensing a liquid from a liquid port in a leading position relative to the imaging objective, the liquid dispensed into a space between the distal end of the imaging objective and the flowcell cover; and (c) while the imaging objective is scanned relative to the flowcell, collecting the liquid into a liquid port in a trailing position relative to the imaging objective, the liquid collected from the space between the distal end of the imaging objective and the flowcell cover.

In some implementations, scanning the imaging objective relative to the flowcell includes changing a translation direction of the flowcell relative to the imaging objective, and changing the translation direction changes which liquid port is in the leading position and which liquid port is in the trailing position.

In another example, a flowcell imaging system includes: (a) a flowcell, the flowcell including a substrate, a cover, and a fluid passageway between the substrate and the cover; (b) an imaging objective; and (c) an actuator configured to translate the flowcell substrate relative to the imaging objective and the flowcell cover; the system being configured to translate the imaging objective and the cover as a unit relative to the flowcell substrate.

In some implementations, the imaging objective is attached to the flowcell cover.

In some implementations, a distal portion of the imaging objective is embedded in the flowcell cover.

In some implementations, a distal portion of the imaging objective extends through the flowcell cover.

In some implementations, the flowcell further includes a fluid seal between the flowcell substrate and the flowcell cover, the fluid seal facilitating retention of liquid in the fluid passageway while the flowcell substrate translates relative to the flowcell cover.

In some implementations, the cover of the flowcell is larger in area than the substrate of the flowcell such that the system is configured to scan the imaging objective throughout an imaging area of the substrate while the cover continues to cover the flowcell.

DETAILED DESCRIPTION

Figure 1:
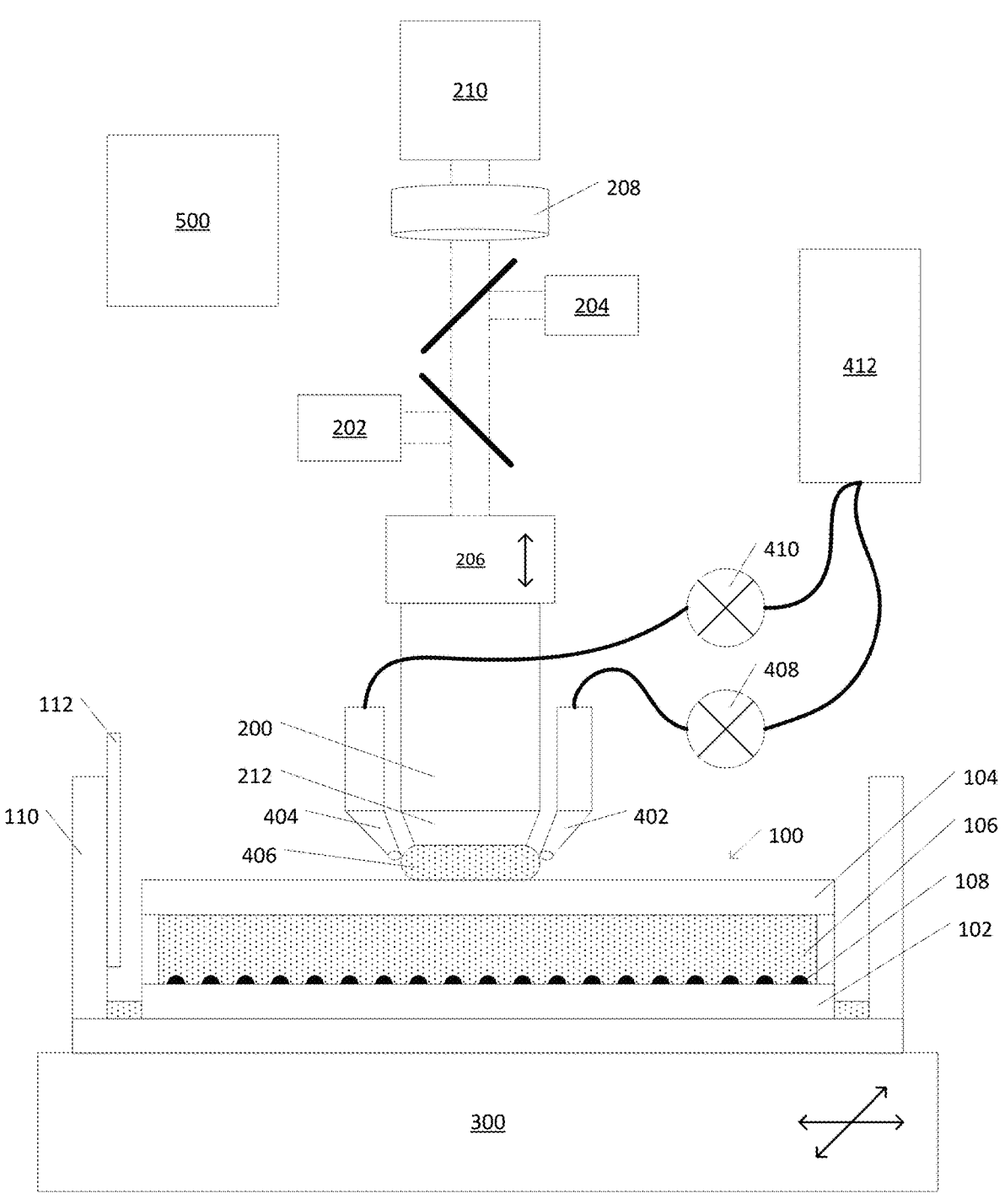
FIG. 1 schematically illustrates an example of a flowcell imaging system.

This disclosure describes optical imaging systems and methods that may be employed in imaging biochemical reactions. For example, the disclosed optical imaging systems and methods may be employed in sequencing template nucleic acid molecules (e.g., DNA molecules, RNA molecules). In some embodiments, the template nucleic acid molecules may be bound to, or otherwise disposed on, a surface of a substrate (e.g., an interior surface of a flowcell) that may be imaged by the optical imaging system. For example, DNA templates may be immobilized at greater than 10e7 positions (spots) in an array on a substrate (e.g., a flowcell). In this example, a nucleic acid sequencing method may involve carrying out greater than 400 sequencing cycles. In each cycle, single nucleotides (e.g., adenine, guanine, thymine, and cytosine) may be flowed across the substrate and incorporated (into a growing strand) at each site where there is a complementary nucleotide base. In one approach, each of the four different nucleotides may be labeled with a different color fluorescent dye or bound by a dye-labeled antibody. In each sequencing cycle, a light source (e.g., a laser) may illuminate the spots (e.g., in series), causing the dye to emit light corresponding to the respective colors. The color emitted at each spot from one of the four dyes may be detected by a camera (e.g., a time delay integration charge-coupled device (TDI-CCD) camera or a similar camera), and the imaging system may thereby record, for each spot, the detection of a nucleotide corresponding to the detected color. Persons knowledgeable in the art will be aware of variations in sequencing methods including variations in template type (see, e.g., Huang et al., 2017, Gigascience 6:1-9; Mardis et al., 2013, Annu Rev Anal Chem 6:287-303), labeling systems (see, e.g., WO2018129214) and labeling strategies (see, e.g., U.S. Pat. No. 9,523,125).

In conventional systems, the emitted light may travel from the spot on the substrate, through a glass coverslip, through an air gap, into a microscope objective, and to the camera, which captures one or more images. In some embodiments, the objective may include a housing and one or more lenses disposed within the housing configured to gather and focus light rays from the substrate and focuses the light rays to produce a magnified image that can be captured by the camera. The system may be configured such that the objective is moved in a pattern over the array of spots on the substrate so that the entire array is imaged during each cycle. Although the disclosure focuses on sequencing nucleic acid molecules, the disclosure contemplates using the disclosed optical imaging system to image other biochemical reactions and perform other biochemical analyses.

One of the significant costs associated with nucleic acid sequencing per gigabase is the quantity of reagents consumed in the sequencing process. For this reason, increasing the density of samples on a substrate significantly reduces the cost of nucleic acid sequencing. The optical Numerical Aperture (NA) of the detection system may determine in part the optical resolution of the system, which may thus determine the maximum density of samples. Optical systems with a high NA tend to be more expensive, larger, and more difficult to align and maintain than optical systems with a low NA.

In particular optical systems (e.g., a confocal optical system), the NA may be limited by the lowest refractive index in the image chain. The reason for the NA limit is the critical angle at each interface between materials. The critical angle defines the maximum ray angle that will not be totally reflected at the interface. When the refractive indices at each interface in the image chain are similar, the critical angle is large. As the difference in refractive indices increases, this critical angle gets smaller, thereby reducing the amount of light that is transmitted through the interface. The objective of an optical system has a relatively high refractive index, and a segment of the image chain with a relatively low refractive index may create a relatively small critical angle, thus reducing the amount of light that is transmitted to the objective. Thus, one way of increasing the NA of such a system without resorting to the more expensive, larger, more complex equipment of high-NA systems may be to raise the refractive index of one or more segments of the image chain that tend to have lower refractive indices. Methods and systems for doing so are disclosed herein.

In conventional optical systems used for nucleic acid sequencing, the segment of the image chain with the lowest refractive index is often an air gap that may be present, for example, between an objective of the optical system and the cover of the flowcell. The air gap generally has index of refraction of about 1.00. In this example, the NA of an example optical imaging system may be approximately 0.8. Replacing the air with a substance having a higher refractive index may increase the overall NA of the optical system. For example, the air gap may be replaced with water, which may raise the lowest refractive index of the image chain to 1.33. In this example, the NA of a similar optical imaging system with water instead of the air gap may be approximately 1.0. As another example, the air gap may be replaced with standard oil, which may raise the lowest refractive index of the image chain to 1.51. In this example, the NA of a similar optical imaging system with water instead of the air gap may be approximately 1.2. As another example, the air gap may be replaced with high-index oil, which may increase the NA further to 1.4. As another example, any suitable water-based or oil-based solution may be used to appropriately cause a desired change to the lowest refractive index. Essentially, the disclosure proposes using a fluid with a refractive index higher than air as a medium in between the objective and the substrate. Raising the lowest refractive index of the image chain has a direct and measurable effect on the NA of the optical imaging system, which allows for increased resolution and therefore increased density of spots on a substrate. This increased density translates to lowered costs, due to a decreased requirement for reagents. This can be illustrated by setting an optical imaging system with an air gap as a benchmark, such that density of such a system is set to a value of 1.00 and relative cost is set to 1.00. With this benchmark in mind, replacing the air gap with water may increase the density to about 1.56 and may correspondingly decrease the relative cost to about 0.64; replacing the air gap with standard oil may increase the density to about 2.25 and may correspondingly decrease the relative cost to about 0.44; and replacing the air gap with high-index oil may increase the density to about 3.06 and may correspondingly decrease the relative cost to about 0.33.

Although the use of fluid mediums with refractive indices higher than air is known in standard microscopy applications using immersion objective optical systems, such applications involve a static imaging process. In dynamic imaging processes, such as the scanning optical system contemplated herein for imaging a substrate as an objective rapidly moves over the substrate, conventional immersion objective optical systems are unsatisfactory. Example optical scanning systems may move the objective at speeds between 10 mm/s and 60 mm/s. In some cases, next-generation sequencing systems may be equipped to move the objective at speeds of around 300 mm/s. Moving an objective of a conventional system within such a fluid medium at such rapid speeds would tend to cause excessive turbulence (and generation of bubbles) that could affect the image quality as well as cause loss of the fluid medium.

This disclosure describes several approaches for eliminating the air gap, while addressing the potential issues that would ordinarily present themselves when the objective is moved rapidly in an immersion liquid. In some embodiments, the approaches disclosed here may be used to allow the objective to move between speeds of 10 mm/s and 60 mm/s, or 10 mm/s and 300 mm/s, while maintaining good image quality using the fluid medium. In some embodiments, very high speeds may be achieved, allowing for speeds between 10 mm/s and 3750 mm/s, or 30 mm/s and 3750 mm/s. This may allow for a camera line rate of, for example, about 1M/s for fast scanning and imaging.

Multi-Nozzle System

FIG. 1 shows an example of a flowcell imaging system. The system shown in FIG. 1 includes a flowcell 100, an imaging objective 200, an actuator 300, and first and second liquid ports 400, 402.

The flowcell 100 shown in FIG. 1 includes a substrate 102, a cover 104, and a fluid passageway 106 between the substrate 102 and cover 104. Biochemical molecules 108 may be bound to, or otherwise disposed on, the interior surface of the substrate 102 in the fluid passageway 106, which may be filled with a water or oil based liquid or other suitable liquid for the particular analysis being carried out with the flowcell 100. For illustration purposes, only a single row of a few biochemical molecules 108 are shown immobilized on substrate 102 in FIG. 1. In some embodiments, greater than 10e7 biochemical molecules may be immobilized in a two dimensional array across substrate 102. In some embodiments, cover 102 may alternatively or additionally be a substrate with biochemical molecules bound thereto. Cover 102 and other components of flowcell 100 may be optically transparent to facilitate imaging therethrough. While not shown in FIG. 1, flowcell 100 may also include fluidic inputs and outputs for flowing sequencing reagents and other liquids through the fluid passageway.

In the example of FIG. 1, the flowcell 100 is positioned inside a container 110 that is configured to capture and retain excess liquid from the first 402 and/or second 404 liquid ports, as discussed further below. Liquid sensor 112 may be used to monitor the liquid level in the container 110 and interrupt operation of the system and/or trigger an alarm if the liquid level in the container 110 reaches an un-desirable level as discussed in further detail below. In some instances, the container may include a drain.

The flowcell 100 and container 110 are positioned on an actuator 300 (in this example an X-Y translation stage) configured to translate the flowcell 100 and container 110 relative to the imaging objective 200. As such, the imaging objective 200 can be scanned or otherwise translated relative to the entirety of an area to be imaged of substrate 102. In other embodiments, the flowcell 100 may remain stationary and the imaging objective 200 may be associated with an actuator configured to translate the imaging objective 200, first liquid port 402, and second liquid port 404 relative to the flow cell 100.

In the example of FIG. 1, the imaging objective 200 is part of an optical sub-system including a light source 202 (e.g. a laser), auto-focus components 204, z-direction actuator 206, additional optical elements (e.g. optical element 208), and camera 210 (e.g. a time delay integration charge-coupled device (TDI-CCD) camera or a similar camera). Controller 500 (e.g. a digital microprocessor) may monitor and control the various components of the optical sub-system and other sub-systems of the FIG. 1 flowcell imaging system.

The imaging objective 200 may be an optical objective configured for immersion in an oil-based, aqueous-based, or other immersion liquid having an refractive index that is greater than the refractive index of air. Immersion liquid may be stored in reservoir 412 as discussed further below.

In the example of FIG. 1, the first and second liquid ports 402, 404 are part of a liquid delivery and collection sub-system that also includes pumps 408, 410 fluidically connected to the first and second liquid ports 402, 404 respectively, and liquid reservoir 412 fluidically connected to the pumps 408, 410. The liquid delivery and collection sub-system may be configured such that, during imaging there is no air gap or air bubbles in the space between the distal end of imaging objective 200 and cover 104, with that space being filled by liquid 406. Liquid 406 may be an oil-based or aqueous-based immersion liquid having a higher index of refraction than air and commonly used for immersion microscopy, or may any other liquid suitable for usage in the system.

The liquid delivery and collection sub-system of FIG. 1 may be configured to dispense liquid into and collect liquid from the space between the distal end 212 of imaging objective 200 while the flowcell 100 is translated relative to the imaging objective 200 and first and second liquid ports 402, 404 by actuator 300. In this particular example, both liquid ports 402, 404 are capable of alternatively dispensing or collecting liquid from the space between the objective 200 and flowcell 100, depending on the translation direction.

Figure 2:
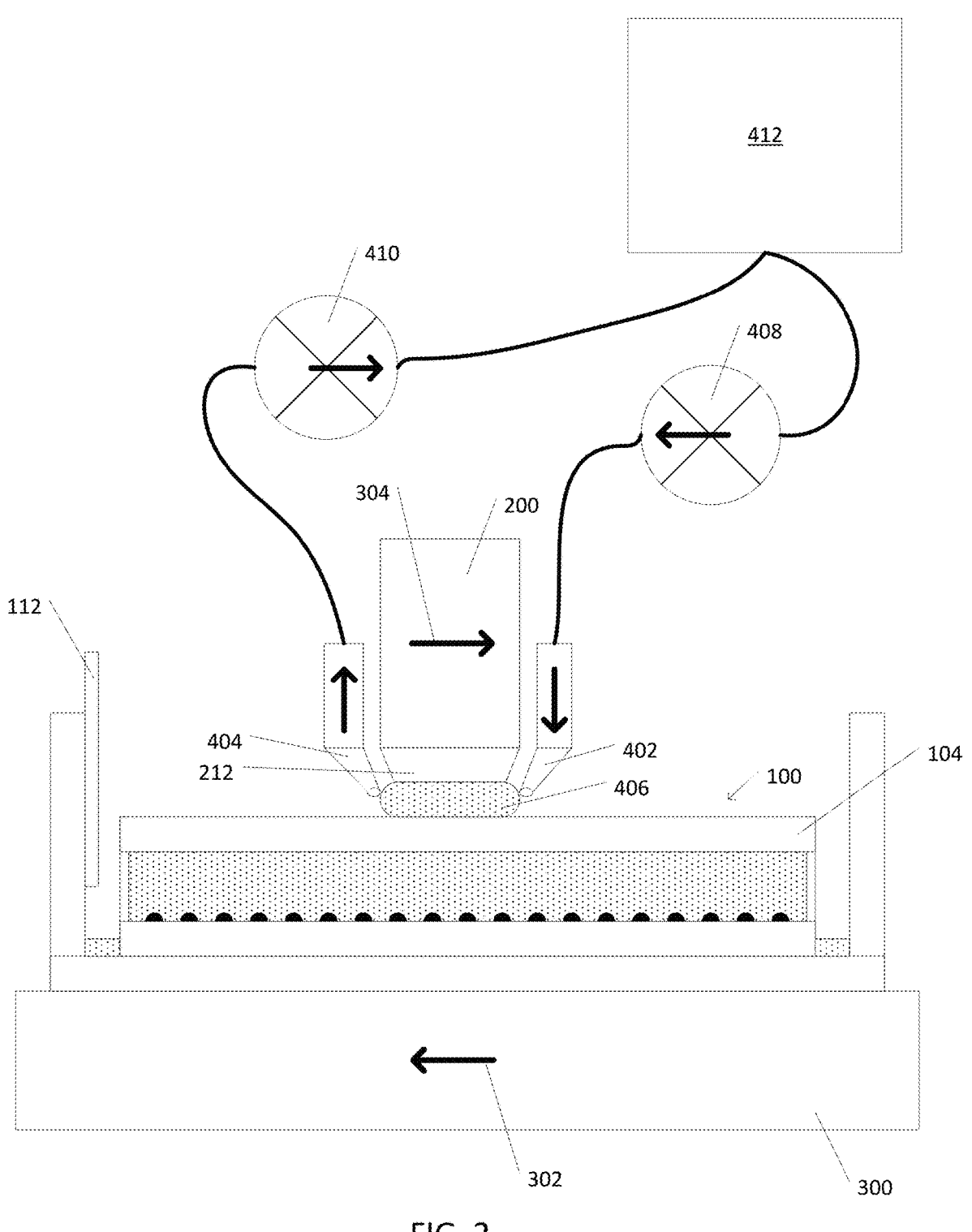
FIGS. 2 and 3 illustrate example operational states of the flowcell imaging system of FIG. 1.

FIG. 2 shows an operational state of the FIG. 1 system in which the actuator 300 is translating flow cell 100 in direction 302, resulting in relative translation of the imaging objective 200 and first and second liquid ports 402, 404 along direction 304. In this example, pumps 408, 410 are reversible pumps. The system operates pump 408 to pump liquid from liquid reservoir 412 to first liquid port 402 such that liquid 406 is dispensed into the space between the distal end 212 of imaging objective 200 and cover 104. The system operates pump 410 to pump liquid from the space between distal end 212 of imaging objective 200 and cover 104 via second liquid port 404 into the liquid reservoir 412.

In this manner, a moving "puddle" or other discrete volume of liquid is maintained around the distal end 212 of imaging objective 200 as imagine objective 200 undergoes relative translation in direction 304, the liquid 406 being shown as sufficient to prevent there being any air gap or air bubbles between the distal end 212 of imaging objective 200 and the cover 104 of flowcell 100. Although FIG. 2 shows the volume of liquid 406 begins and ends at the liquid ports 402, 404, in other implementations, the liquid 406 may extend beyond the liquid ports 402, 404.

Figure 3:
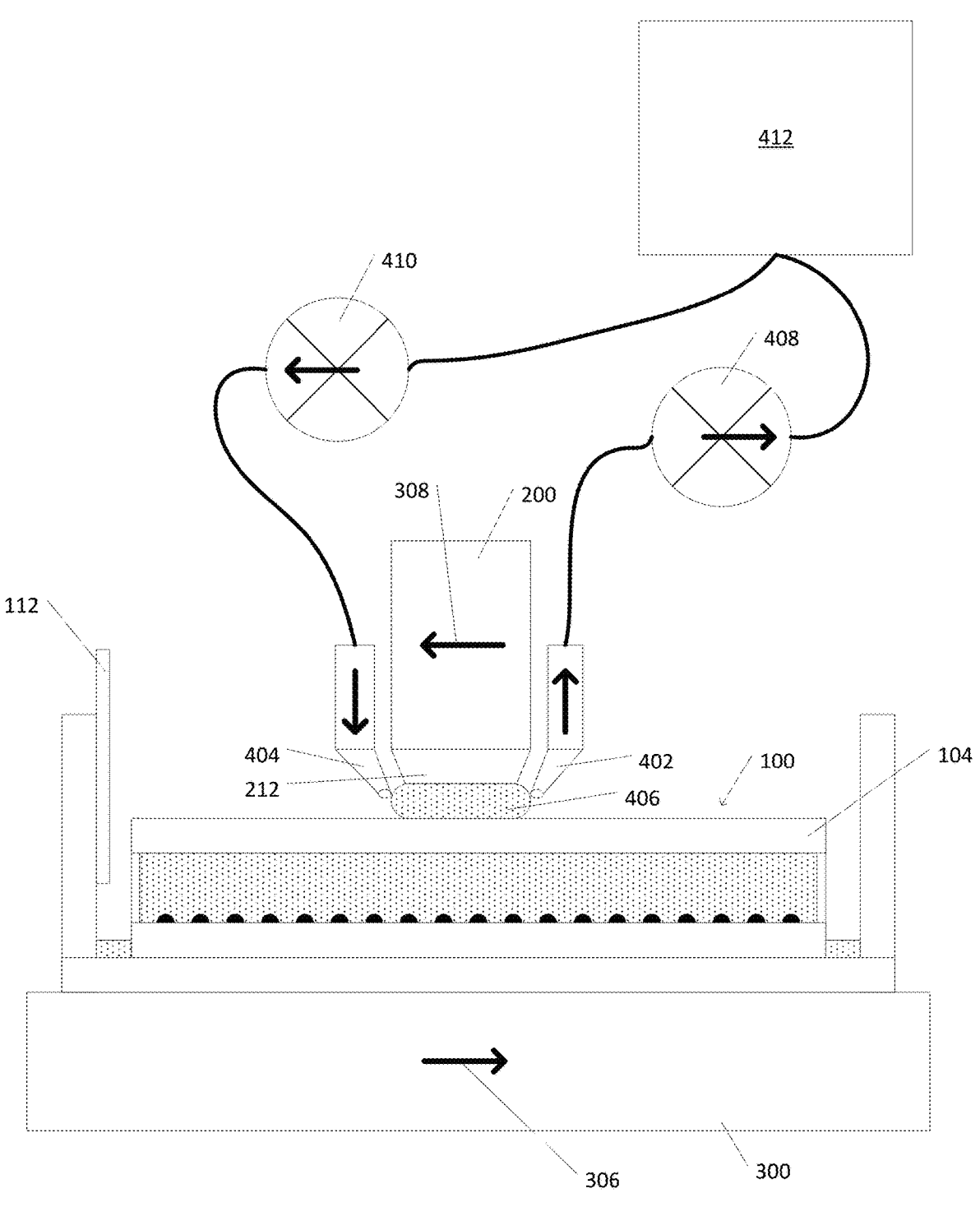
Figure 4A:
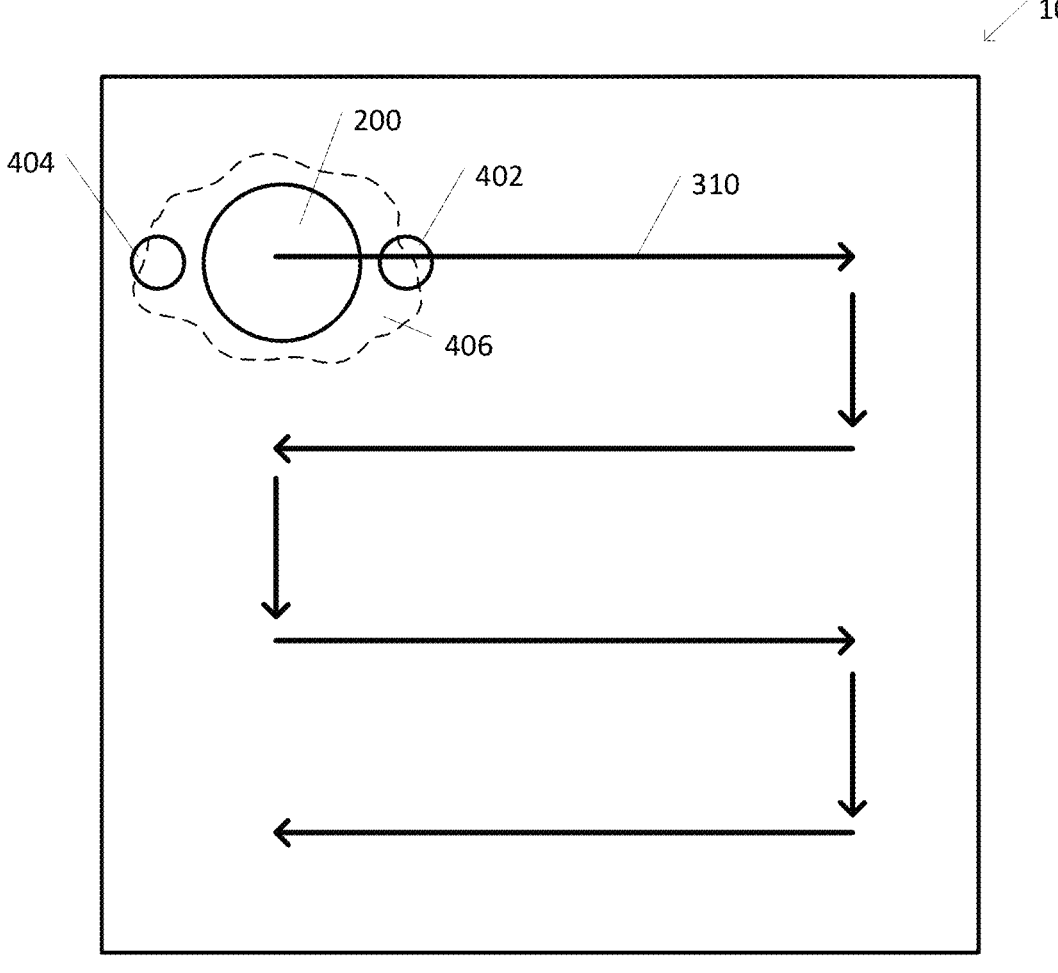
FIGS. 4A-H schematically illustrate an example of an imaging objective and associated liquid ports scanning relative to a flowcell.
Figure 4B:
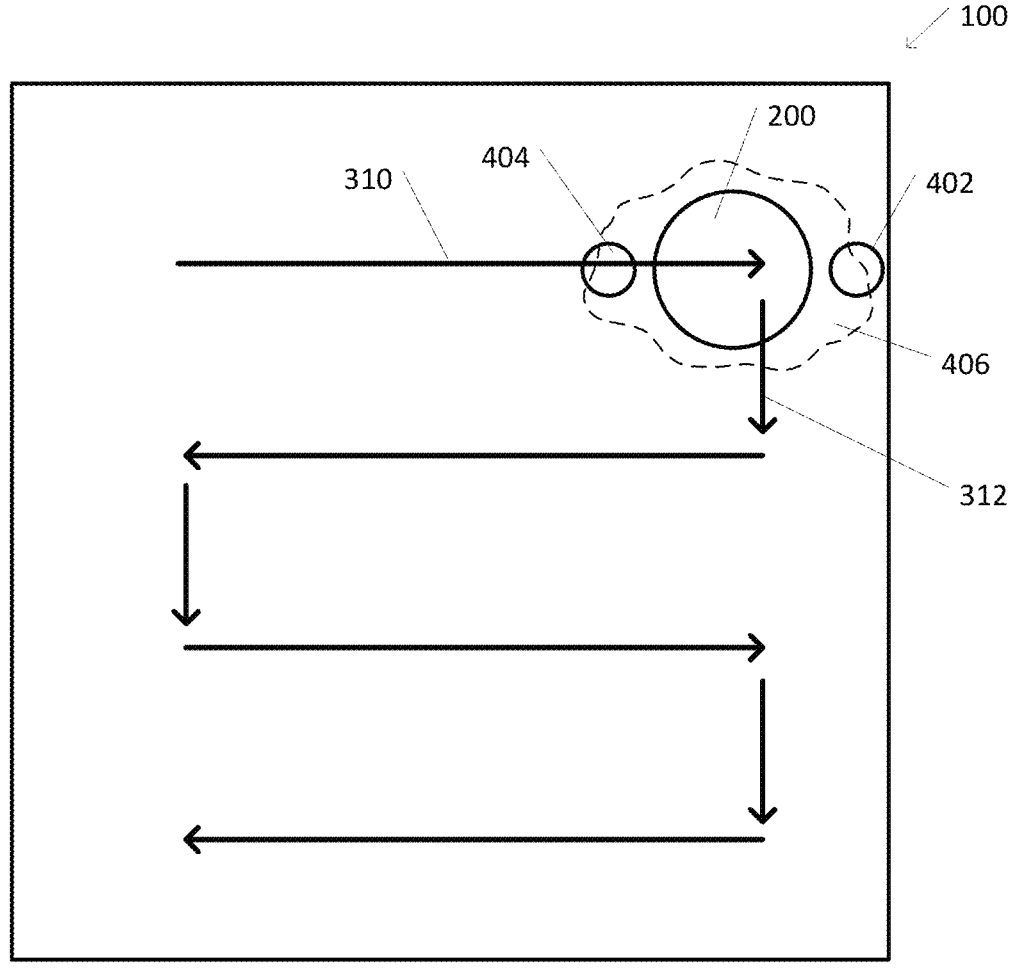
Figure 4C:
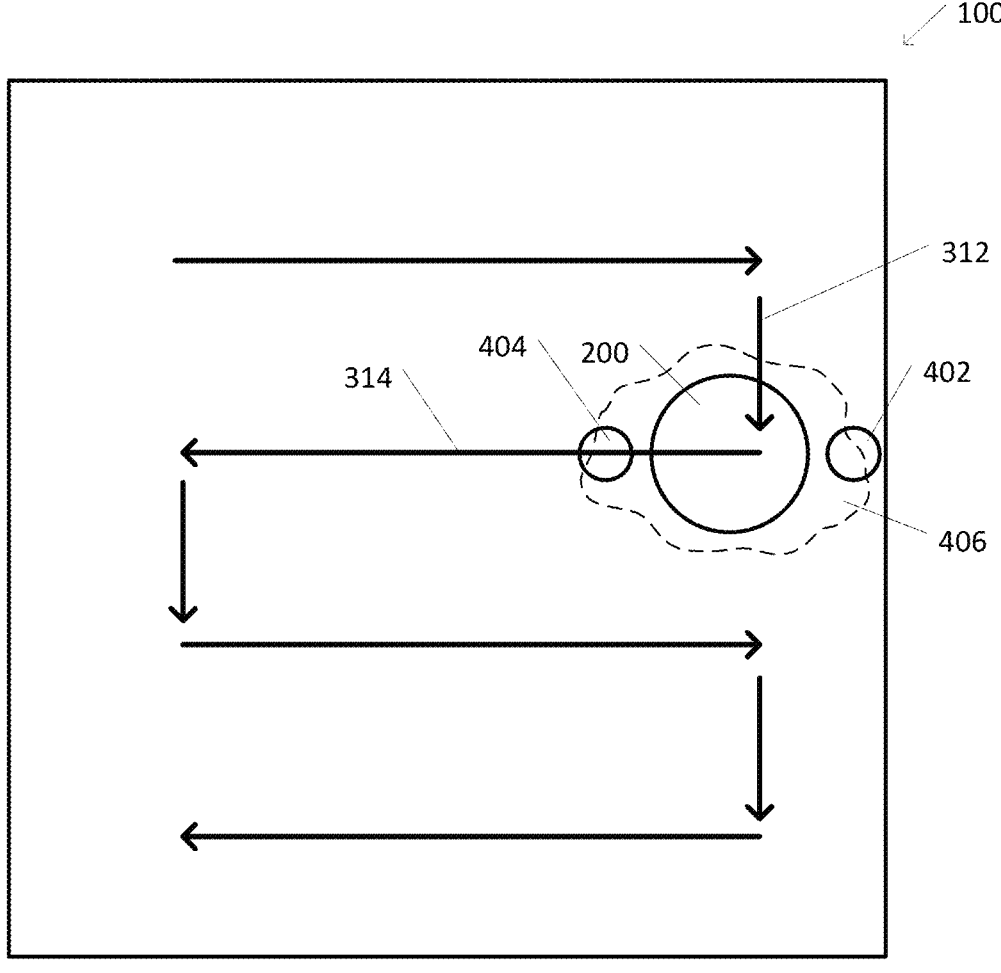
Figure 4D:
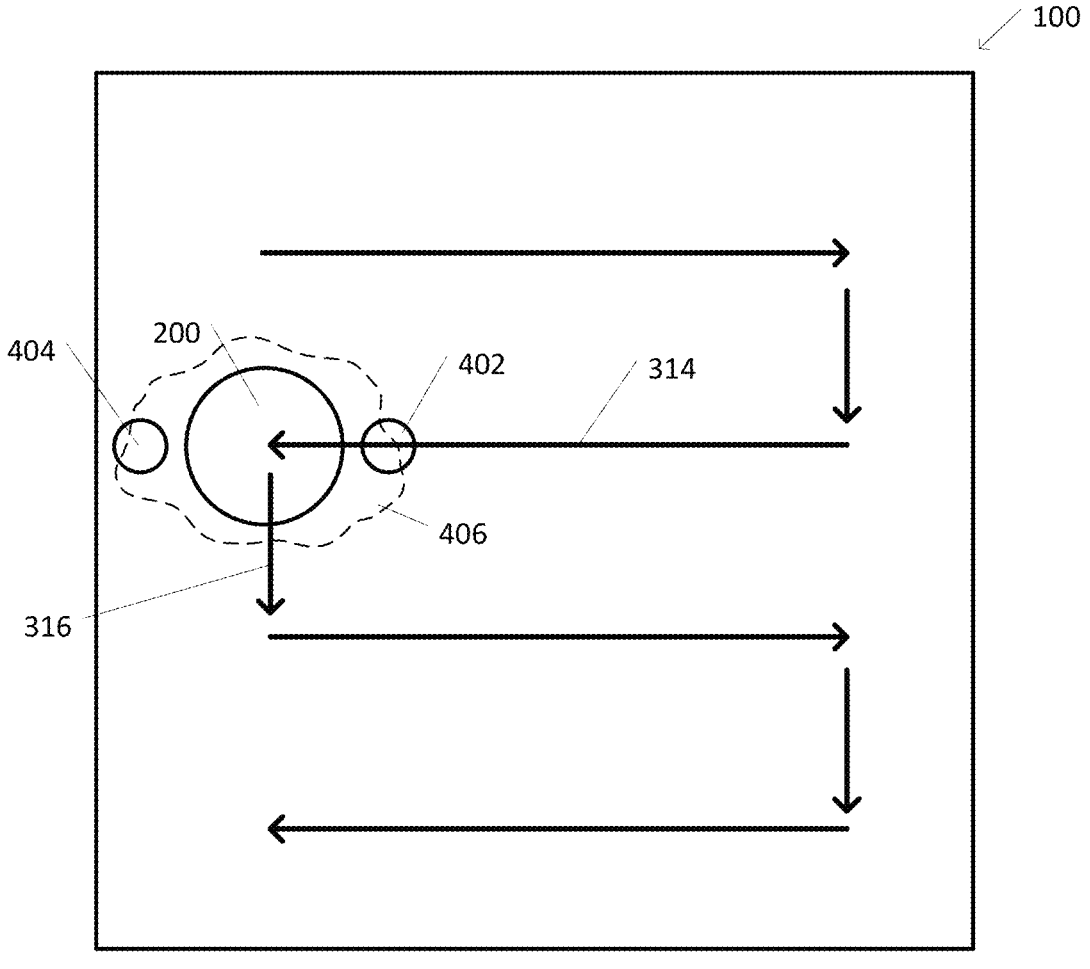
Figure 4E:
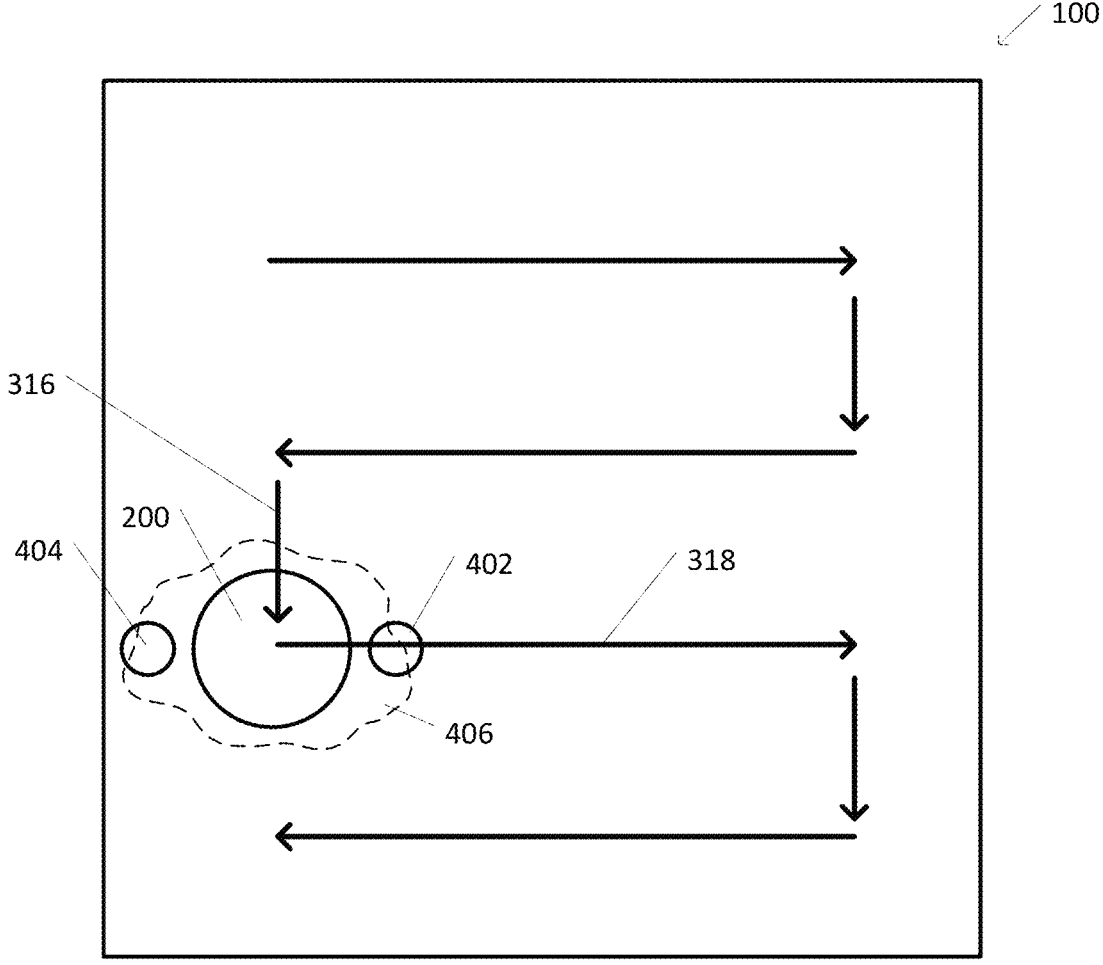
Figure 4F:
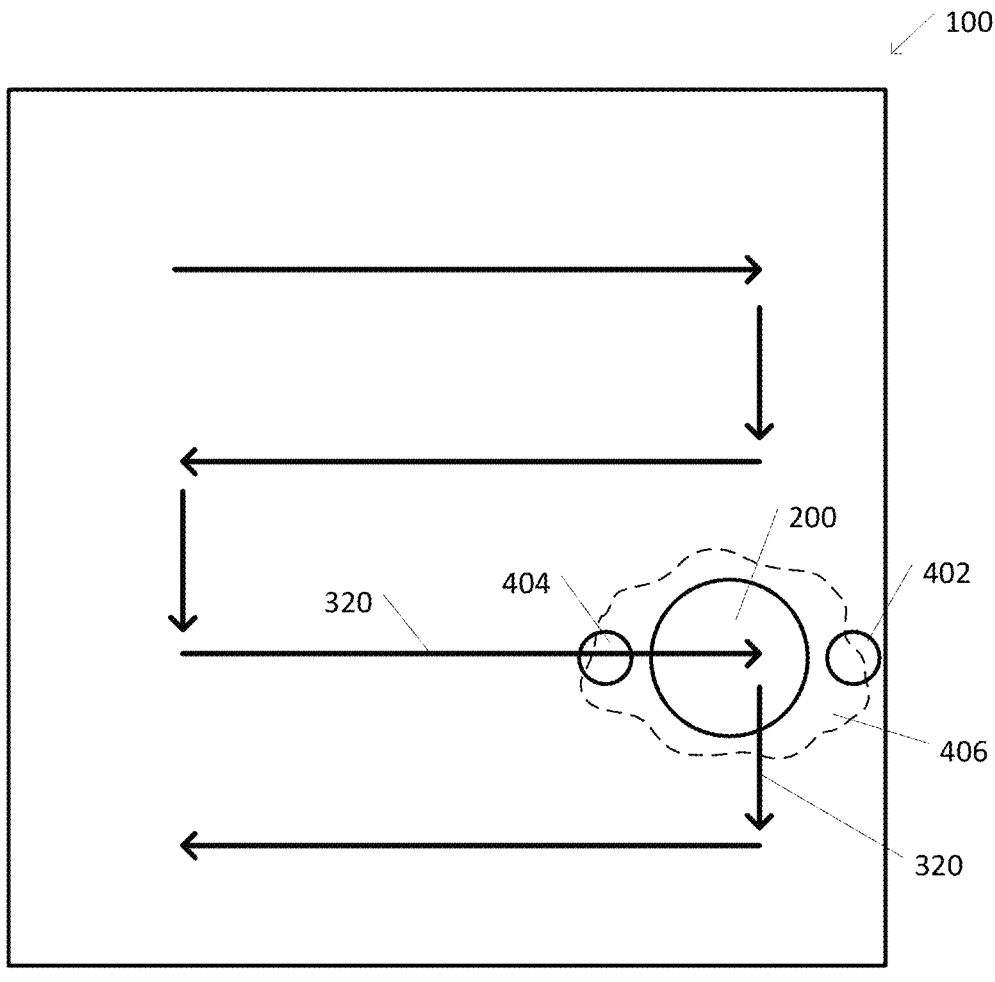
Figure 4G:
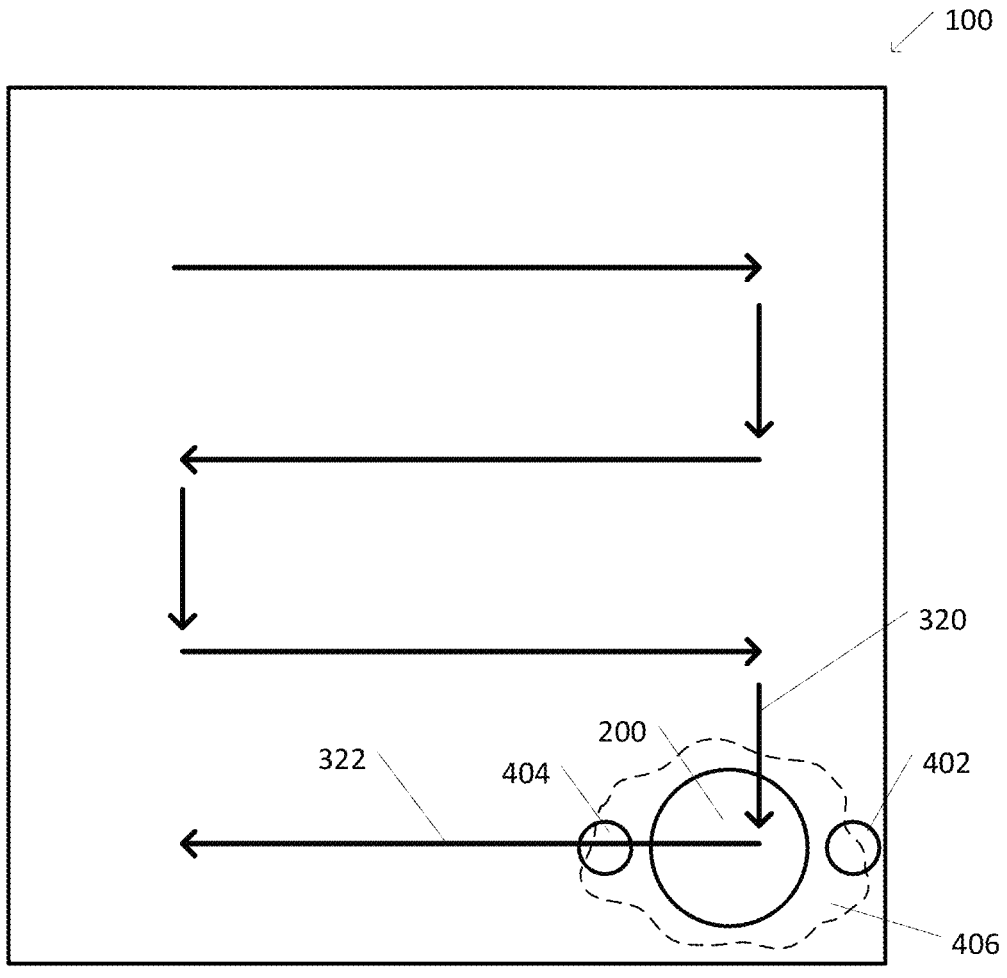
Figure 4H:
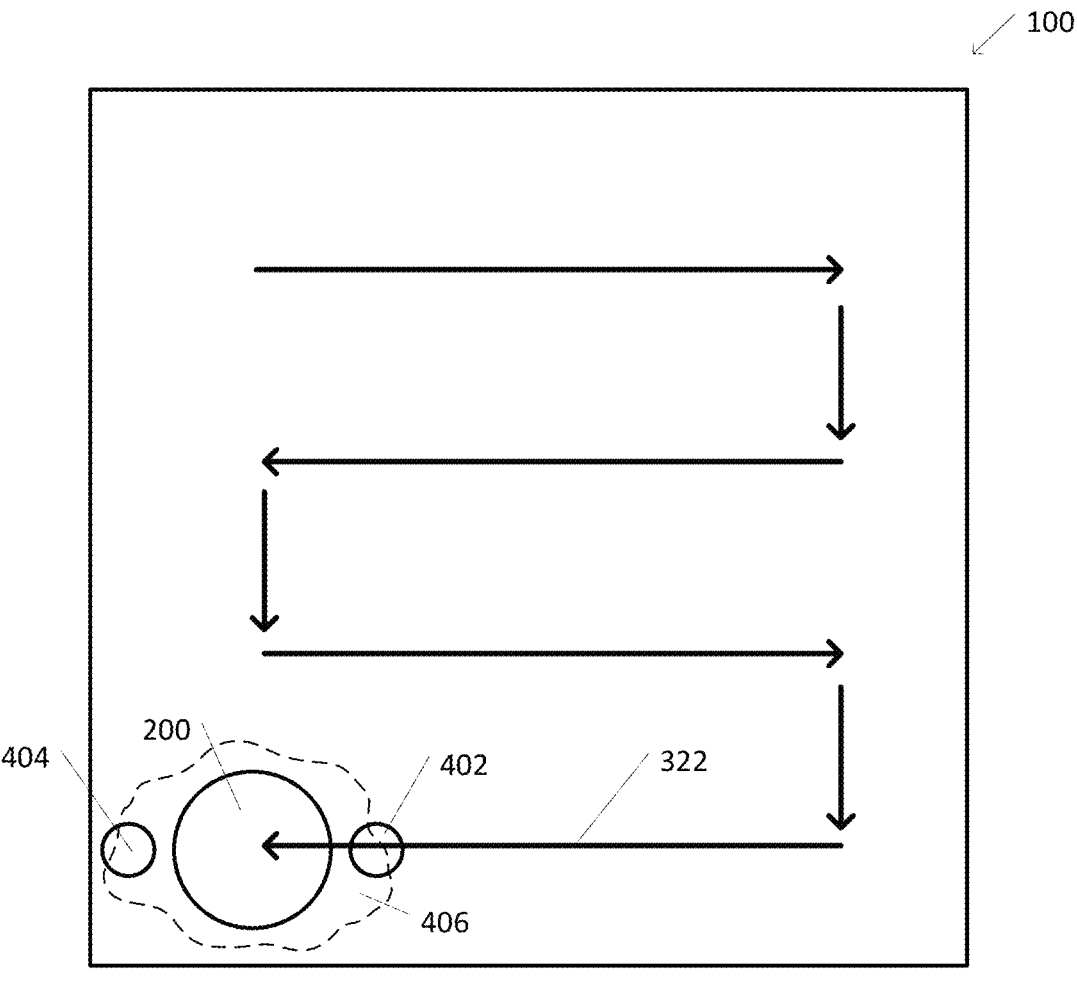

FIG. 3 shows a second operational state of the FIG. 1 system in which the actuator 300 is translating flow cell 100 in direction 306 opposite to direction 302 in FIG. 2, resulting in relative translation of the imaging objective 200 and first and second liquid ports 402, 404 along direction 308. In this second state, the system operates pump 410 to pump liquid from liquid reservoir 412 to second liquid port 404 such that liquid 406 is dispensed into the space between the distal end 212 of imaging objective 200 and cover 104. The system operates pump 408 to pump liquid via first liquid port 402 from the space between distal end 212 of imaging objective 200 and cover 104 into the liquid reservoir 412. In this manner, a "puddle" or other discrete volume of liquid is maintained around the distal end 212 of imaging objective 200 as imagine objective 200 undergoes relative translation in direction 308.

The system may be configured to monitor during operation the performance of the liquid delivery and collection sub-system, to ensure that there is not too much or too little liquid. As noted above, liquid sensor 112 may be triggered when either too much liquid is dispensed and/or not enough liquid is collected. Defects in images collected by the imaging sub-system may also be detected, indicating the presence of air gaps or bubbles between the objective 200 and cover 104, which in turn may indicate that not enough liquid is being dispensed and/or too much liquid is being collected by the liquid ports 402, 404.

FIGS. 4A-H illustrate a scanning process using the system of FIGS. 1-3. In FIGS. 4A-H, imaging objective 200 and first and second liquid ports 402, 404 are scanned relative to flowcell 100 along directions 310 (FIGS. 4A-B), 312 (FIGS. 4B-C), 314 (FIGS. 4C-D), 316 (FIGS. 4D-E), 318 (FIGS. 4E-F), 320 (FIGS. 4F-G), and 322 (FIGS. 4G-H) in order. Directions 310, 314, 318, and 322 are oriented along an x-axis and directions 312, 316, and 318 are oriented along a y-axis. X-axis directions 310 and 318 are opposite to x-axis directions 314 and 322.

In this example, when the imaging objective 200 is scanned relative to the flowcell 100 along x-axis directions 310 and 318 (as shown in FIGS. 4A-4B and 4E-4F), liquid is dispensed from liquid port 402 and collected into liquid port 404, with liquid port 402 being in a leading position relative to the imaging objective 200 and liquid port 404 being in a trailing position relative to the imaging objective 200. When the imaging objective 200 is scanned relative to the flowcell 100 along x-axis directions 314 and 322 (as shown in FIGS. 4C-4D and 4G-4H), liquid is dispensed from liquid port 404 and collected into liquid port 402, with liquid port 404 being in the leading position and liquid port 402 being in the trailing position. As shown in FIGS. 4A-H, changing the translation direction of the imaging objective relative to the flowcell coincides with changing which liquid port is dispensing liquid at the leading position relative to the imaging objective 200 and which liquid port is collecting liquid at the trailing position relative to the imaging objective 200. As shown in FIGS. 4A-H, this forms a moving puddle of liquid 406 that moves along with the imaging objective 200.

Figure 5:
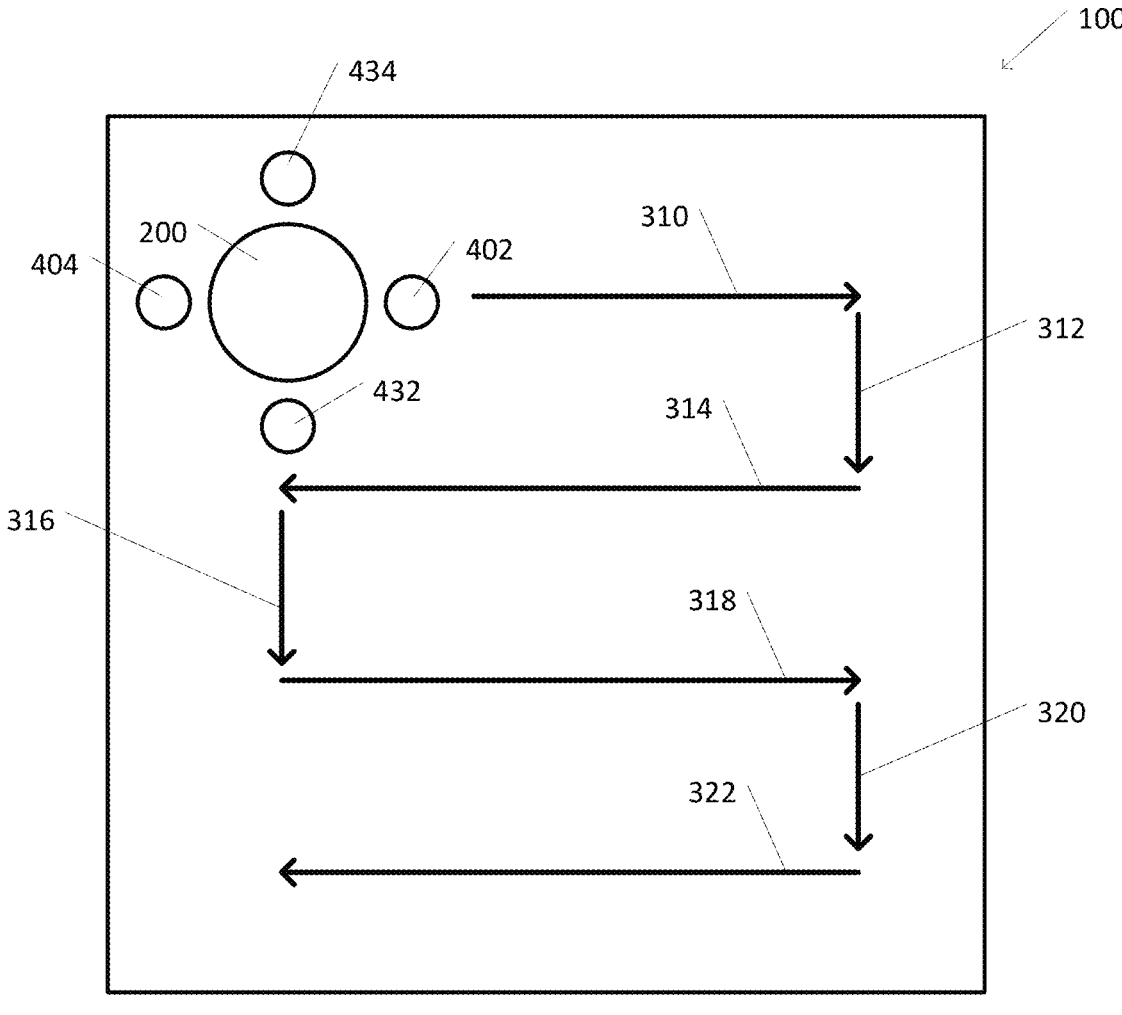
FIG. 5 schematically illustrates another example of an imaging objective and associated liquid ports scanning relative to a flowcell.

FIG. 5 illustrates an example scanning process using a system that is configured differently from the system shown in FIGS. 1-3. The system shown in FIG. 5 includes four liquid ports 402, 404, 432, 434 located on four sides of imaging objective 200, with liquid ports 402, 404 opposite to one another and liquid ports 432, 434 opposite to one another. In this example, the system is configured to dispense and collect liquid both when the imaging objective 200 is scanned relative to flowcell 100 in x-axis directions 310, 314, 318, and 322 and when the imaging objective 200 is scanned relative to flowcell 100 in y-axis directions 312, 316, and 320.

In this example, the liquid port that is the leading position relative to the translation direction will operate to dispense liquid and the liquid port that is in the trailing position relative to the translation direction will operate to collect liquid.

Specifically, when imaging objective 200 initially translates relative to flowcell 100 in direction 310, liquid port 402 will dispense liquid and liquid port 404 will collect liquid, with liquid ports 432, 434 not dispensing or collecting liquid. When imaging objective 200 next translates relative to flowcell in direction 312, liquid port 432 will dispense liquid and liquid port 434 will collect liquid, with liquid ports 402, 404 not dispensing or collecting liquid. When imaging objective 200 next translates relative to flowcell in direction 314, liquid port 404 will dispense liquid and liquid port 402 will collect liquid, with liquid ports 432, 434 not dispensing or collecting liquid. When imaging objective 200 next translates relative to flowcell in direction 316, liquid port 432 will dispense liquid and liquid port 434 will collect liquid, with liquid ports 402, 404 not dispensing or collecting liquid. When imaging objective 200 next translates relative to flowcell in direction 318, liquid port 402 will dispense liquid and liquid port 404 will collect liquid, with liquid ports 432, 434 not dispensing or collecting liquid. When imaging objective 200 next translates relative to flowcell in direction 320, liquid port 432 will dispense liquid and liquid port 434 will collect liquid, with liquid ports 402, 404 not dispensing or collecting liquid. Finally, when imaging objective 200 translates relative to flowcell in direction 322, liquid port 404 will dispense liquid and liquid port 402 will collect liquid, with liquid ports 432, 434 not dispensing or collecting liquid.

In the example of FIG. 5, the liquid ports that are not located in-line with the direction of translation are not operated to dispense or collect liquid. In other implementations, the liquid ports that are not located in-line with the direction of translation may also be operated to collect liquid.

In still other implementations, the liquid ports will not necessarily be located in-line with the direction of translation, but may still be operated in a manner to dispense and collect liquid such that a moving puddle of liquid moves with the imaging objective during scanning relative to the flowcell.

The liquid delivery and collection sub-system may be configured in other ways than shown in foregoing description. For example, FIGS. 1-3 show pumps 408, 410 as reversible; however, in other configurations, each liquid port 402, 404 may be associated with two pumps, with one pump configured to cause its associated port to dispense liquid, and the other pump configured to cause its associated port to collect liquid. Additionally or alternatively, the liquid delivery and collection sub-system may include multiple fluid reservoirs, with one reservoir configured to dispense fresh liquid and the other reservoir configured to collect used liquid.

In the example shown in FIGS. 1-3, fluid ports 402, 404 are positioned and oriented to dispense and collect fluid directly at the space between the objective's distal end 212 and the cover 104. In other configurations, fluid ports 402, 404 may still dispense into and collect from the space between the objective's distal end 212 and the cover 104, but be positioned further "upstream" and "downstream" from the objective 200.

Figure 6:
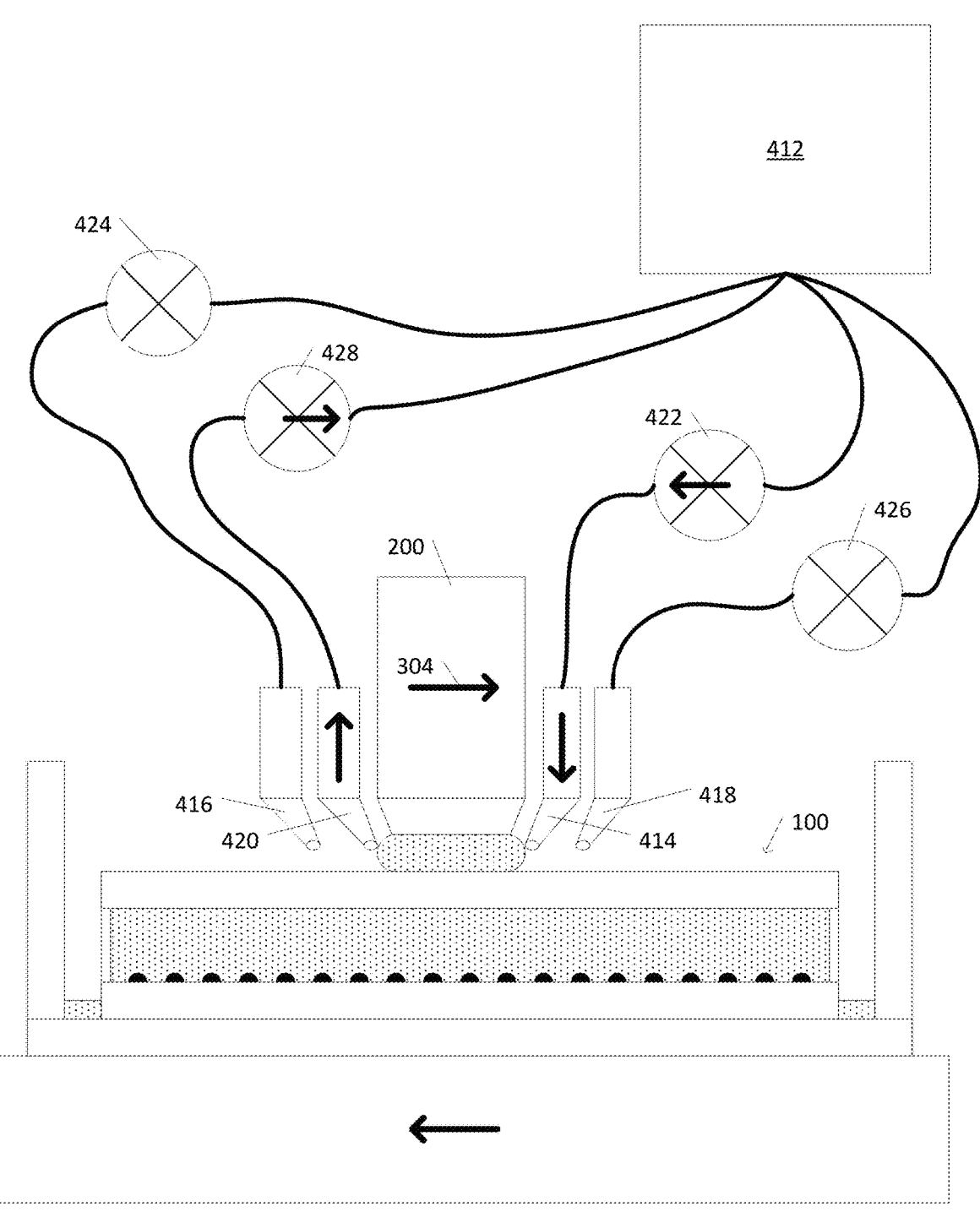
FIGS. 6-7 schematically illustrates another example of a flowcell imaging system.
Figure 7:
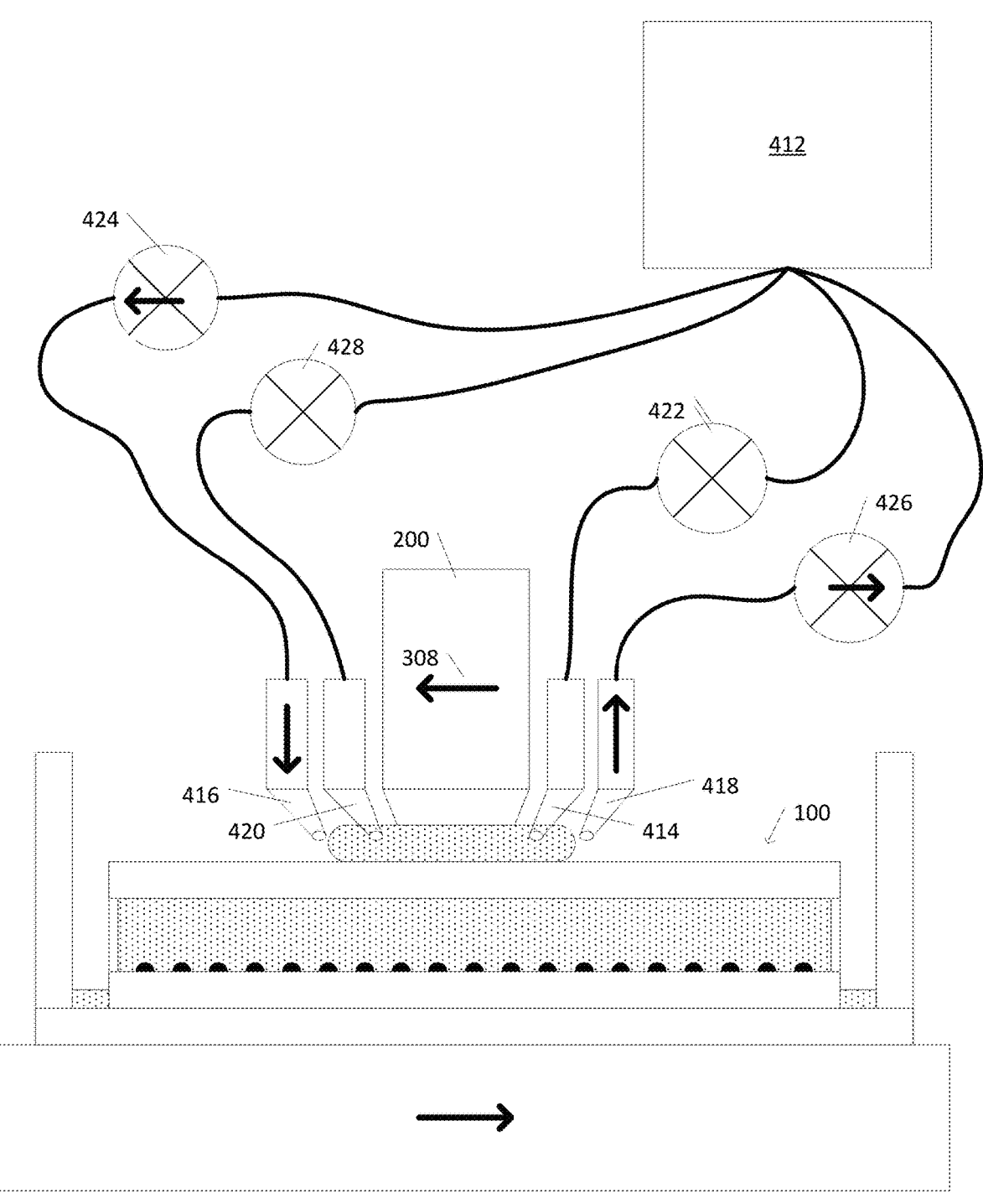

FIGS. 6-7 show yet another example of a configuration for a liquid delivery and collection sub-system. In this example, each pump and liquid port assembly is configured to move liquid in a single direction. In this example, there are four liquid ports 414, 416, 418, 420. Two of the liquid ports 414, 416 are on one side of imaging objective 200, and two of the liquid ports 418, 420 are on another side of imaging objective 200. Each of the liquid ports 414, 416, 418, 420 is fluidically connected to a pump 422, 424, 426, 428 respectively. In this example, pumps 422, 424, 426, 428 are each configured to pump liquid in a single direction. When operated, pump 422 is configured to pump liquid from liquid reservoir 412 to liquid port 414. When operated, pump 424 is configured to pump liquid from liquid reservoir 412 to liquid port 416. When operated, pump 426 is configured to pump liquid from liquid port 418 to liquid reservoir 412. When operated, pump 428 is configured to pump liquid from liquid port 420 to liquid reservoir 412.

In the operational state shown in FIG. 6, liquid pump 422 pumps liquid from reservoir 412 to liquid port 414 and liquid pump 428 pumps liquid from liquid port 420 to reservoir 412 as the objective 200 translates in direction 304 relative to flowcell 100. In the operational state shown in FIG. 6, pumps 424 and 426 do not operate. In the operational state shown in FIG. 7, liquid pump 424 pumps liquid from reservoir 412 to liquid port 416 and liquid pump 426 pumps liquid from liquid port 418 to reservoir 412 as the objective 200 translates in direction 308 relative to flowcell 100. In the operational state shown in FIG. 7, pumps 422 and 428 do not operate.

Moving Cover System

Figure 8:
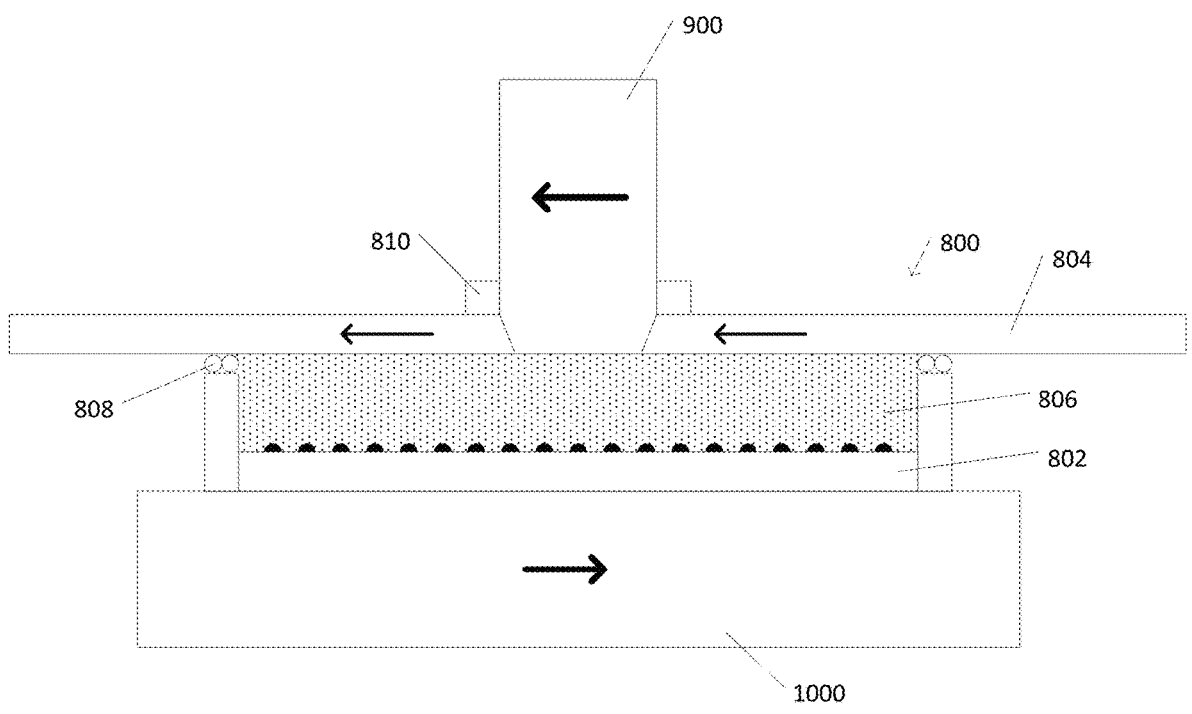
FIG. 8 schematically illustrates another example of a flowcell imaging system.

FIG. 8 shows another example of a flowcell imaging system that avoids any air gaps between the distal end of the imaging objective and the flowcell. The system in this example includes a flowcell 800, an imaging objective 900, and an actuator 1000.

The flowcell 800 includes a substrate 802, a cover 804, and a fluid passageway 806 between the substrate 802 and cover 804. In this example, the cover 804 and substrate 802 are not attached and are moveable relative to one another. Seals 808 may be located where the cover 804 contacts walls of the substrate 802 to allow cover 804 to move relative to substrate 802 while retaining liquid inside the fluid passageway 806.

As shown in FIG. 8, the cover 804 is attached to the imaging objective 900, with a distal portion 902 of the imaging objective 900 embedded in or otherwise extending through the cover 904. A clamp ring 810 may be adhered or otherwise fixed to cover 804, and may be clamped around imaging objective 900 to attach the imaging objective 900 to the cover 804.

Actuator 1000 is configured to translate the flowcell substrate 802 relative to the flowcell cover 804, and because the imaging objective 900 is attached to the flowcell cover 804, the imaging objective and the cover will translate as a unit relative to the flowcell substrate 802.

Figure 9:
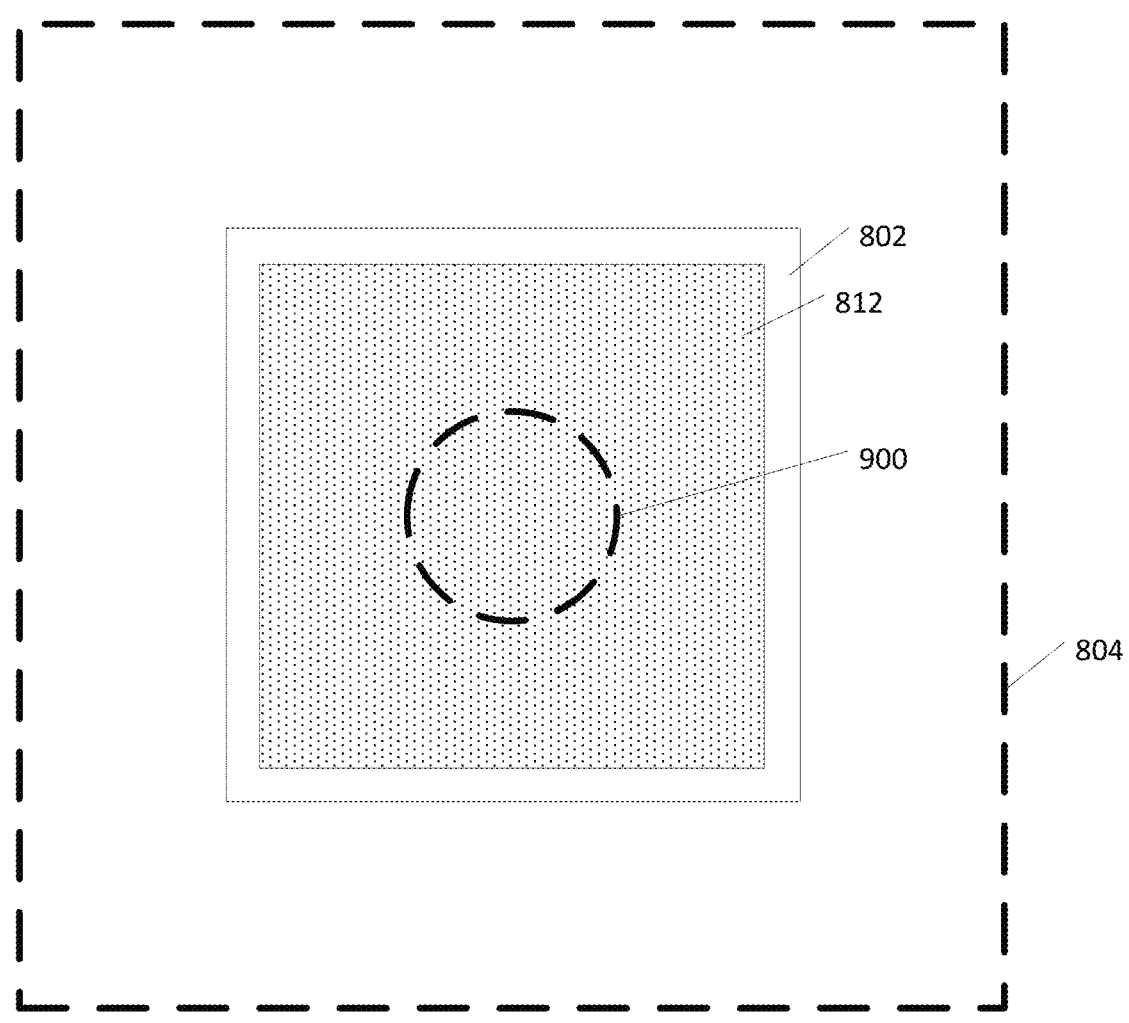
FIG. 9 shows the flowcell imaging system of FIG. 8 from above, with the imaging objective and flowcell cover shown in dashed lines.
Figure 10A:
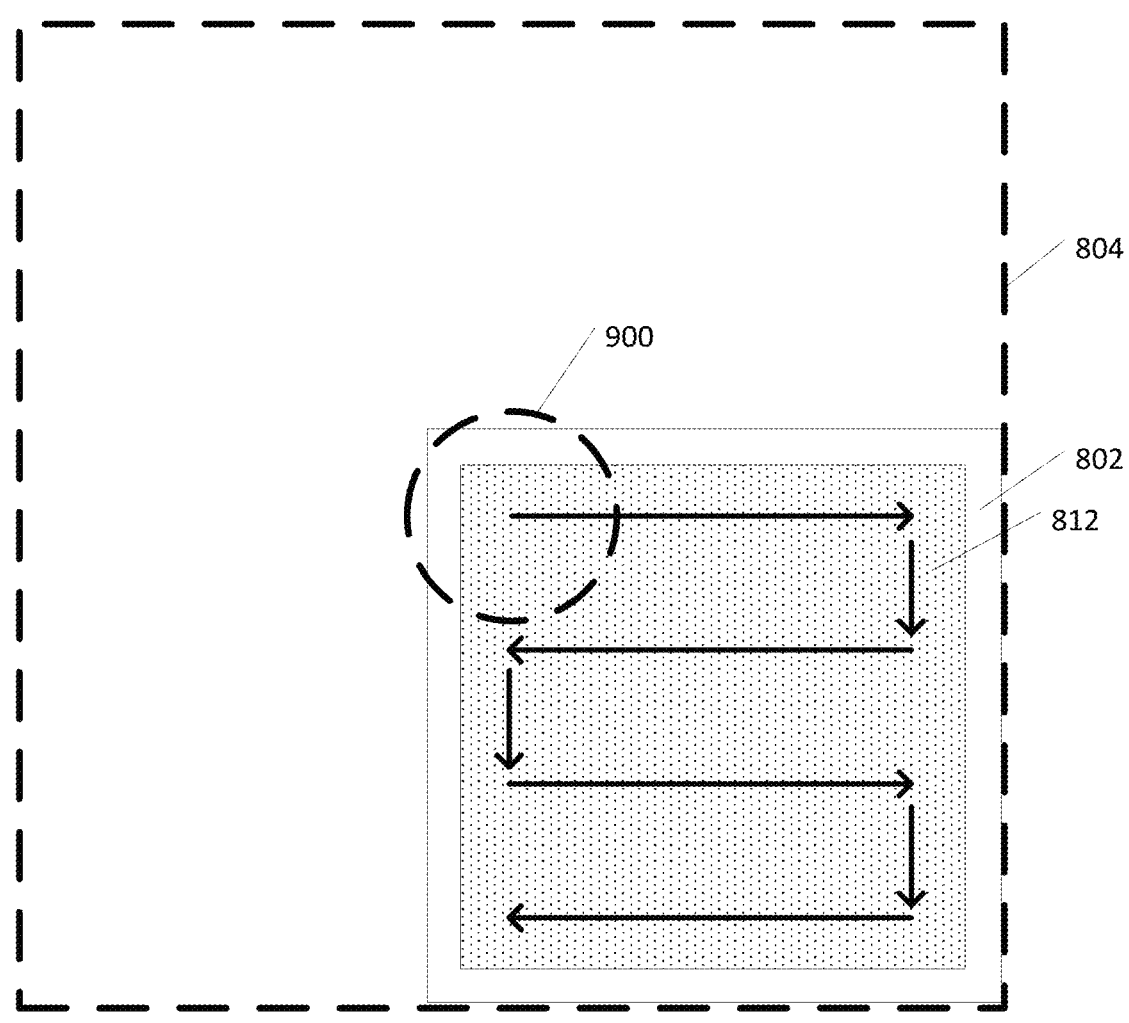
FIGS. 10A-D show the flowcell imaging system of FIG. 8 from above, illustrating the relative positions of the imaging objective and flow cell cover relative to the flowcell substrate during a scanning process.
Figure 10B:
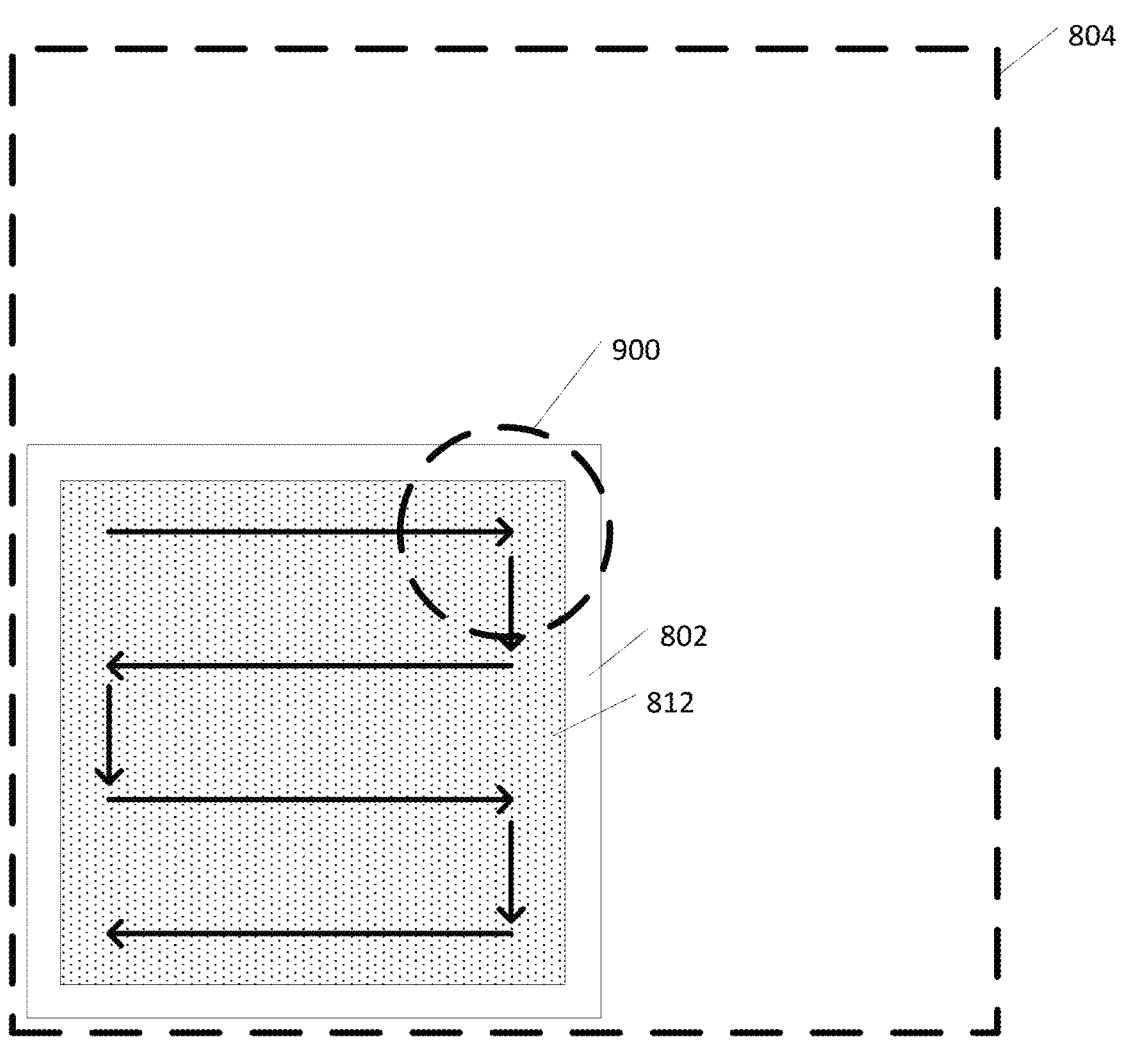
Figure 10C:
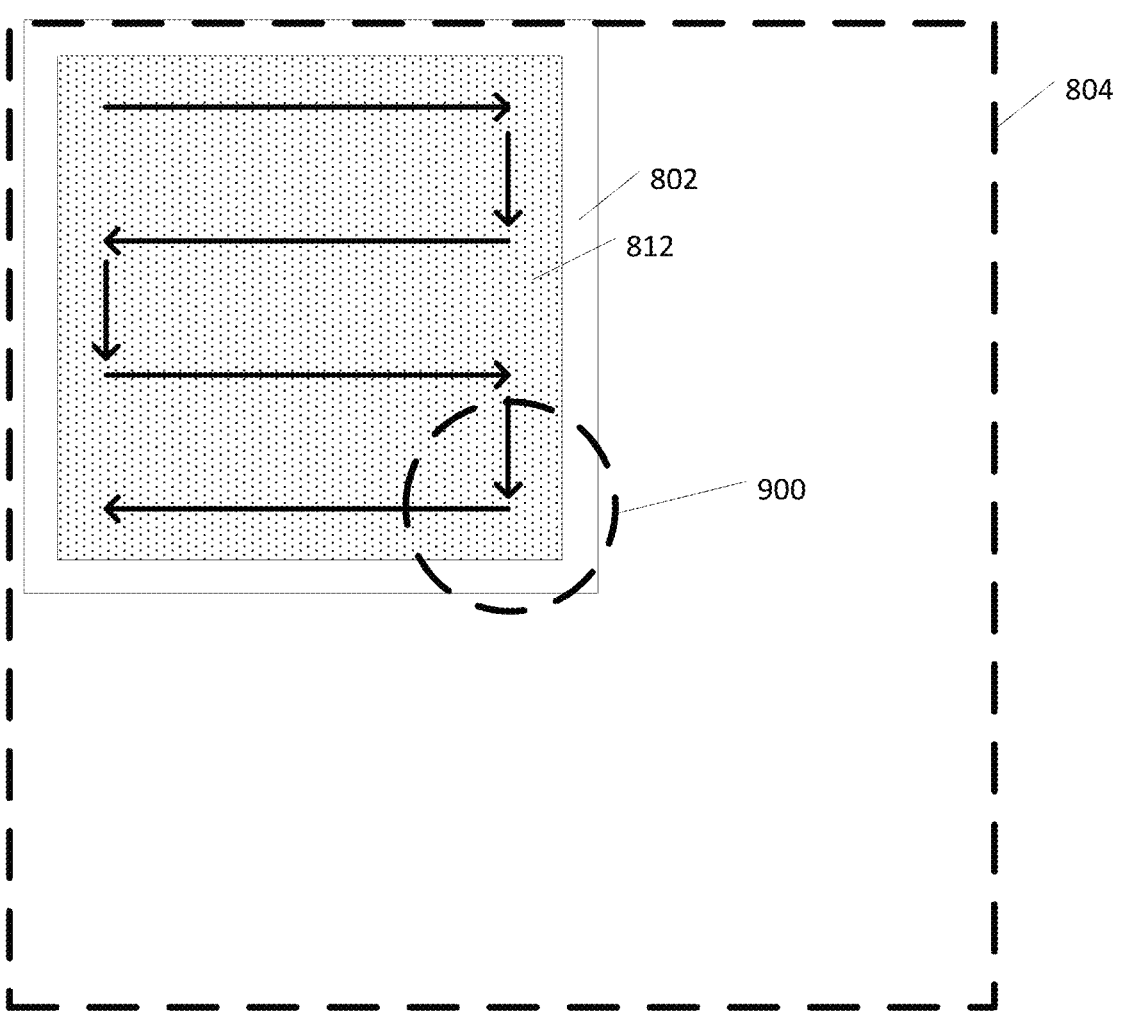
Figure 10D:
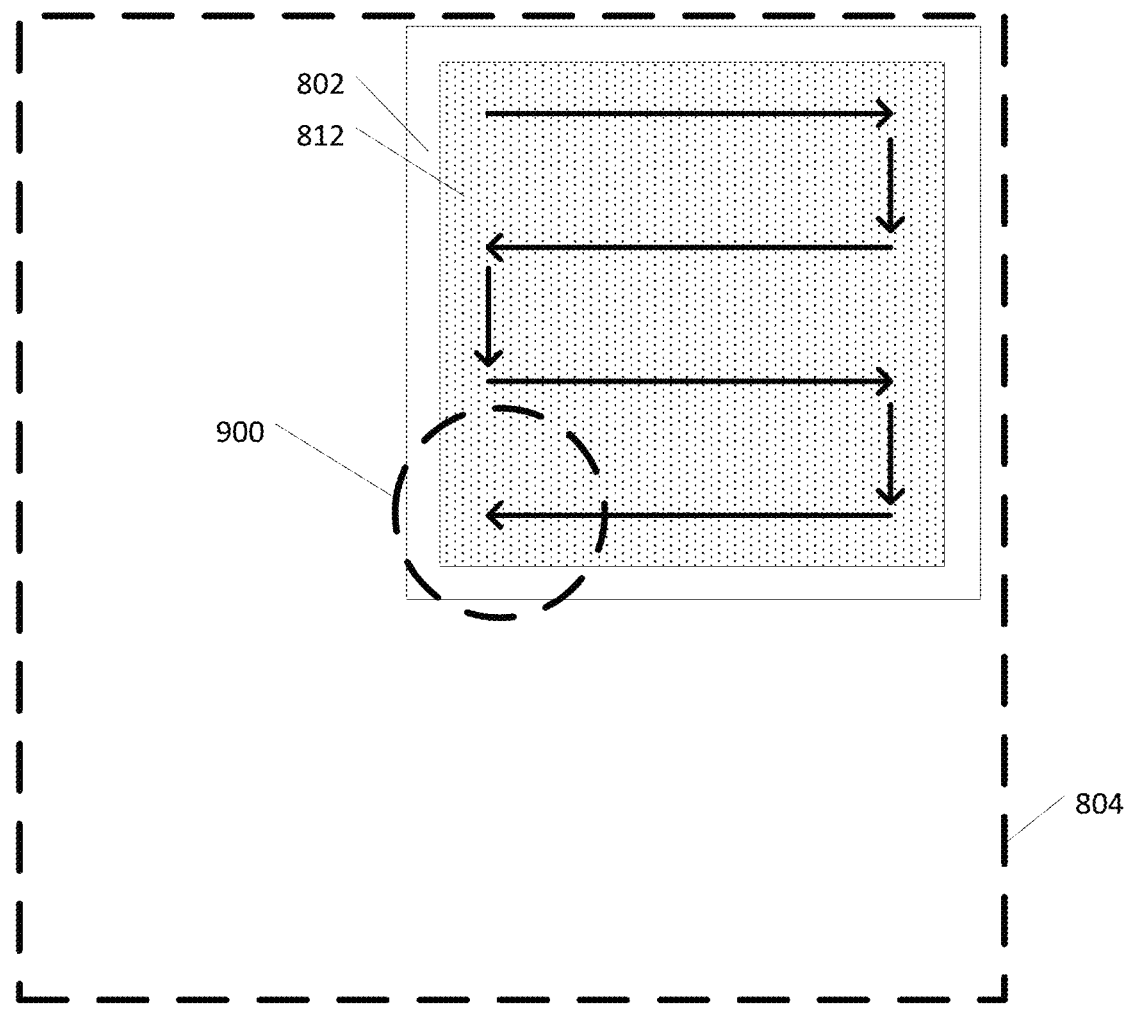

As shown in FIG. 8, the flowcell cover 804 may be larger than the flowcell substrate 802. As such, the system may be configured to scan the imaging objective 900 throughout an imaging area of the flowcell substrate 802 while the cover 804 continues to cover the substrate 802. FIG. 9 shows the system of FIG. 8 from the top-down, and FIGS. 10A-10D illustrate how the cover 804 has a sufficiently large area for imaging objective 900 to be scanned throughout an imaging area 812 of the substrate 802 while the cover 804 continues to cover the substrate 802.

CONCLUSION

The above-described systems and methods are provided by way of example only. Additions, deletions, substitutions, modifications, and other changes may be made to the above-described examples without departing from the scope or spirit of the following claims.

The invention claimed is:

1. A flowcell imaging system, comprising:
(a) a flowcell, the flowcell comprising a substrate, a cover, and a fluid passageway between the substrate and the cover;

(b) an imaging objective, the imaging objective comprising a distal end spaced from the flowcell cover;
(c) an actuator configured to translate the flowcell relative to the imaging objective;
(d) a first liquid port, wherein the system is configured to dispense a liquid from the first liquid port into a space between the distal end of the imaging objective and the flowcell cover while the flowcell translates relative to the imaging objective; and
(e) a second liquid port, wherein the system is configured to collect the liquid into the second liquid port from the space between the distal end of the imaging objective and the flowcell cover while the flowcell translates relative to the imaging objective.

2. The flowcell imaging system of claim 1, wherein the system is configured to maintain a moving puddle of liquid between the distal end of the imaging objective and the cover of the flowcell as the flowcell translates relative to the imaging objective.

3. The flowcell imaging system of claim 1, wherein the system is configured to maintain a moving puddle of liquid that fills the space between the distal end of the imaging objective and the cover of the flowcell as the flowcell translates relative to the imaging objective.

4. The flowcell imaging system of claim 1, wherein the imaging objective comprises a first side and a second side opposite the first side, wherein the first liquid port is positioned at the first side of the imaging objective and the second liquid port is positioned at the second side of the imaging objective.

5. The flowcell imaging system of claim 1, wherein the system is configured to dispense the liquid from the first liquid port and collect the liquid into the second liquid port while the system images the flowcell.

6. The flowcell imaging system of claim 1, wherein the actuator comprises a translation stage configured to move the flowcell.

7. The flowcell imaging system of claim 1, wherein, while the actuator translates the flowcell relative to the imaging objective in a first direction, the first liquid port dispenses the liquid into the space between the distal end of the imaging objective and the flowcell and the second liquid port collects the liquid from the space between the distal end of the imaging objective and the flowcell.

8. The flowcell imaging system of claim 7, wherein, while the actuator translates the flowcell relative to the imaging objective in the first direction, the first liquid port is in a leading position relative to the translation of the imaging objective and the second liquid port is in a trailing position relative to the translation of the imaging objective.

9. The flowcell imaging system of claim 7, wherein the system is configured to alternatively dispense and collect the liquid from the first liquid port and is configured to alternatively dispense and collect the liquid from the second liquid port.

10. The flowcell imaging system of claim 9, wherein the first and second liquid ports are fluidically connected to a pumping sub-system that operates in a first state to dispense the liquid from the first liquid port and collect the liquid into the second liquid port and that operates in a second state to dispense the liquid from the second liquid port and collect the liquid into the first liquid port.

11. The flowcell imaging system of claim 7, wherein, while the actuator translates the flowcell relative to the imaging objective in a second direction different from the first direction, the second liquid port dispenses the liquid into the space between the distal end of the imaging objective and the flowcell and the first liquid port collects the liquid from the space between the distal end of the imaging objective and the flowcell.

12. The flowcell imaging system of claim 1, further comprising a third liquid port and a fourth liquid port.

13. The flowcell imaging system of claim 12, wherein the system is configured to dispense the liquid from the first liquid port and collect the liquid into the second liquid port while the actuator translates the flowcell relative to the imaging objective in a first direction, and wherein the system is configured to dispense the liquid from the third liquid port and collect the liquid into the fourth liquid port while the actuator translates the flowcell relative to the imaging objective in a second direction different from the first direction.

14. The flowcell imaging system of claim 13, wherein the second direction is opposite the first direction.

15. The flowcell imaging system of claim 12, wherein the system is configured to dispense the liquid from the first liquid port and collect the liquid into the second liquid port while the actuator translates the flowcell relative to the imaging objective in a first direction;

wherein the system is configured to dispense the liquid from the second liquid port and collect the liquid into the first liquid port while the actuator translates the flowcell relative to the imaging objective in a second direction different from the first direction; and wherein the system is configured to dispense the liquid from the third liquid port and collect the liquid into the fourth liquid port while the actuator translates the flowcell relative to the imaging objective in a third direction different from the first and second directions.

16. The flowcell imaging system of claim 1, wherein the cover comprises a second substrate of the flowcell.

17. The flowcell imaging system of claim 1, wherein the actuator is configured to translate the flowcell relative to both the imaging objective and the first and second liquid ports.

18. A flowcell imaging method comprising:

(a) scanning an imaging objective relative to a flowcell, wherein:

(i) the flowcell comprises a substrate, a cover, and a fluid passageway between the substrate and the cover, and (ii) the imaging objective comprises a distal end spaced from the flowcell cover;

(b) while the imaging objective is scanned relative to the flowcell, dispensing a liquid from a liquid port in a leading position relative to the imaging objective, the liquid dispensed into a space between the distal end of the imaging objective and the flowcell cover; and (c) while the imaging objective is scanned relative to the flowcell, collecting the liquid into a liquid port in a trailing position relative to the imaging objective, the liquid collected from the space between the distal end of the imaging objective and the flowcell cover.

19. The flowcell imaging method of claim 18, wherein scanning the imaging objective relative to the flowcell includes changing a translation direction of the flowcell relative to the imaging objective, and wherein changing the translation direction changes which liquid port is in the leading position and which liquid port is in the trailing position.

* * * * *